United States Patent
Hill et al.

(10) Patent No.: US 10,683,708 B2
(45) Date of Patent: Jun. 16, 2020

(54) FRAC MANIFOLD AND SYSTEMS

(71) Applicant: KHOLLE Magnolia 2015, LLC, Houston, TX (US)

(72) Inventors: Larry Mitchel Hill, Cypress, TX (US); William Brent Stroebel, Houston, TX (US); Scott Taylor Donaldson, Spring, TX (US); E. Lee Colley, III, Houston, TX (US)

(73) Assignee: KHOLLE Magnolia 2015, LLC, Houston, TX (US)

( * ) Notice: Subject to any disclaimer, the term of this patent is extended or adjusted under 35 U.S.C. 154(b) by 0 days.

(21) Appl. No.: 15/837,912

(22) Filed: Dec. 11, 2017

(65) Prior Publication Data
US 2018/0187662 A1   Jul. 5, 2018

Related U.S. Application Data

(63) Continuation-in-part of application No. 15/627,904, filed on Jun. 20, 2017, which is a continuation-in-part
(Continued)

(51) Int. Cl.
*E21B 17/04* (2006.01)
*F04B 15/02* (2006.01)
(Continued)

(52) U.S. Cl.
CPC ............ *E21B 17/04* (2013.01); *E21B 43/26* (2013.01); *F04B 15/02* (2013.01); *F04B 23/02* (2013.01);
(Continued)

(58) Field of Classification Search
CPC .......... E21B 14/04; E21B 43/26; F16L 23/02; F16L 23/032; F16L 23/12; F16L 41/008;
(Continued)

(56) References Cited

U.S. PATENT DOCUMENTS 6,302,141 B1   10/2001   Markulec et al.
6,874,538 B2   4/2005   Bennett
(Continued)

OTHER PUBLICATIONS

AGR Field Operations, *Laser Video Inspection* (undated).
(Continued)

*Primary Examiner* — Tara E Schimpf
(74) *Attorney, Agent, or Firm* — Keith B. Willhelm

(57) ABSTRACT

Missile flow lines are incorporated into frac manifolds, especially trailered or skidded frac manifolds. The missiles manifold the discharge from a plurality of pumps and comprise at least two junction fittings joined by spooled pipe. The junction fittings comprise a body having a primary bore and at least two feed bores. The intersections of the feed bores with the primary bore are offset axially from each other along the primary bore. The junction fittings are joined by flange unions to at least one spooled pipe such a that the junction fittings and spooled pipe form a conduit including the primary bores. A discharge line from a pump may be joined to each feed union face of the junction fittings by a flange union. Thus, the discharge from the pumps may be manifolded into the conduit.

29 Claims, 24 Drawing Sheets
(4 of 24 Drawing Sheet(s) Filed in Color)

Related U.S. Application Data of application No. 15/399,102, filed on Jan. 5, 2017, now Pat. No. 10,538,973.

(51) Int. Cl.

| | |
|---|---|
| *E21B 43/26* | (2006.01) |
| *F04B 23/02* | (2006.01) |
| *F04B 23/04* | (2006.01) |
| *F16L 41/02* | (2006.01) |
| *F04B 49/08* | (2006.01) |
| *F04B 53/00* | (2006.01) |
| *F04B 53/22* | (2006.01) |
| *F04B 37/12* | (2006.01) |
| *F04B 47/02* | (2006.01) |
| *F16L 41/00* | (2006.01) |
| *F16L 41/03* | (2006.01) |
| *F16L 23/032* | (2006.01) |
| *F16L 23/12* | (2006.01) |
| *F16L 41/08* | (2006.01) |
| *F16L 41/04* | (2006.01) |
| *F16L 23/02* | (2006.01) |

(52) U.S. Cl.
CPC .............. *F04B 23/04* (2013.01); *F04B 37/12* (2013.01); *F04B 47/02* (2013.01); *F04B 49/08* (2013.01); *F04B 53/00* (2013.01); *F04B 53/22* (2013.01); *F16L 23/032* (2013.01); *F16L 41/008* (2013.01); *F16L 41/02* (2013.01); *F16L 41/023* (2013.01); *F16L 41/03* (2013.01); *F16L 23/02* (2013.01); *F16L 23/12* (2013.01); *F16L 41/04* (2013.01); *F16L 41/088* (2013.01)

(58) Field of Classification Search
CPC . F16L 41/02; F16L 41/03; F16L 41/04; F16L 41/088
See application file for complete search history.

(56) References Cited

U.S. PATENT DOCUMENTS

| | | | |
|---|---|---|---|
| 7,686,041 | B2 | 3/2010 | Eidsmore et al. |
| 8,376,046 | B2 | 2/2013 | Broussard, II |
| 8,469,108 | B2 | 6/2013 | Kajaria et al. |
| 8,656,990 | B2 | 2/2014 | Kajaria et al. |
| 8,813,836 | B2 | 8/2014 | Kajaria et al. |
| 8,950,433 | B2 | 2/2015 | Manofsky, Jr. et al. |
| 8,978,763 | B2 | 3/2015 | Guidry |
| 9,127,545 | B2 | 9/2015 | Kajaria et al. |
| 9,227,252 | B2 | 1/2016 | Horiguchi |
| 2007/0114039 | A1 | 5/2007 | Hobdy et al. |
| 2010/0300672 | A1 | 12/2010 | Childress et al. |
| 2011/0048695 | A1 | 3/2011 | Cherewyk et al. |
| 2013/0014947 | A1* | 1/2013 | Wilkins ................ E21B 33/068 166/281 |
| 2015/0000766 | A1 | 1/2015 | Arizpe et al. |
| 2015/0184491 | A1 | 7/2015 | Kajaria et al. |
| 2016/0115773 | A1* | 4/2016 | Conrad ................... E21B 43/26 166/308.1 |
| 2018/0223640 | A1* | 8/2018 | Keihany ................ E21B 43/26 |

OTHER PUBLICATIONS

Belzona Polymerics Limited, *Next Generation Coatings for Erosion-Corrosion Protection* (undated).

Cameron, *Frac Manifold Systems—Increase Operational Efficiencies of Simultaneous Completion Operations* (© 2016 Schlumberger).

Cameron, *Monoline Flanged-Connection Fracturing Fluid Delivery Technology* (© 2016 Schlumberger).

Forum Energy Technologies, *Smart Solutions. Powerful Products.* (undated—print date Jan. 2018) (with undated photos).

Pipelines International, *The Ultimate Guide to Unpiggable Pipelines* (undated).

* cited by examiner

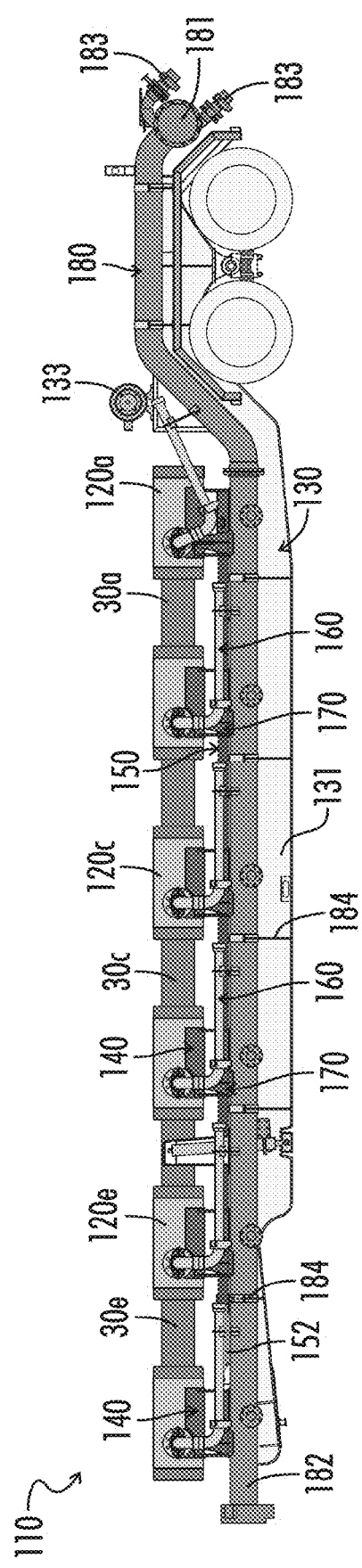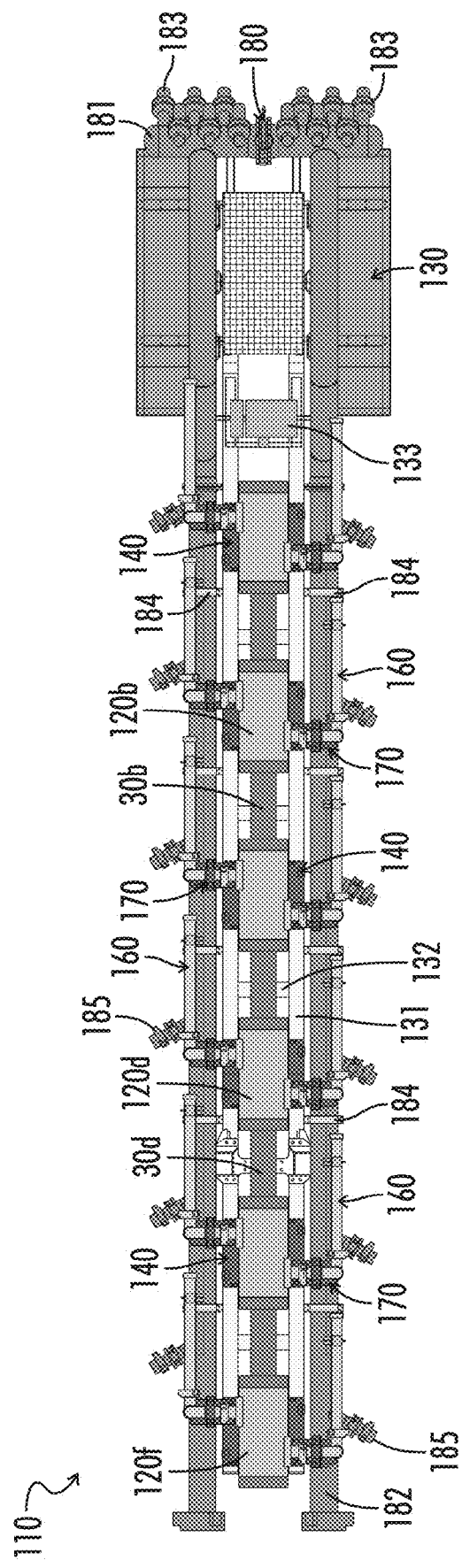
FIG. 3
FIG. 4

FRAC MANIFOLD AND SYSTEMS

FIELD OF THE INVENTION

The present invention relates generally to fluid transportation systems and flow lines used in those systems, and especially to frac manifolds, flow lines, and flowline components used to convey abrasive, corrosive fluids under high pressure as are common, for example, in the oil and gas industry.

BACKGROUND OF THE INVENTION

Hydrocarbons, such as oil and gas, may be recovered from various types of subsurface geological formations. The formations typically consist of a porous layer, such as limestone and sands, overlaid by a nonporous layer. Hydrocarbons cannot rise through the nonporous layer. Thus, the porous layer forms a reservoir, that is, a volume in which hydrocarbons accumulate. A well is drilled through the earth until the hydrocarbon bearing formation is reached. Hydrocarbons then are able to flow from the porous formation into the well.

In what is perhaps the most basic form of rotary drilling methods, a drill bit is attached to a series of pipe sections or "joints" referred to as a drill string. The drill string is suspended from a derrick and rotated by a motor in the derrick. A drilling fluid or "mud" is pumped down the drill string, through the bit, and into the bore of the well. This fluid serves to lubricate the bit. The drilling mud also carries cuttings from the drilling process back to the surface as it travels up the wellbore. As the drilling progresses downward, the drill string is extended by adding more joints of pipe.

When the drill bit has reached the desired depth, larger diameter pipes, or casing, are placed in the well and cemented in place to prevent the sides of the borehole from caving in. The well may be extended by drilling additional sections and installing large, but somewhat smaller pipes, or liners. The liners also are typically cemented in the bore. The liner may include valves, or it may then be perforated. In either event, openings in the liner are created through which oil can enter the cased well. Production tubing, valves, and other equipment are installed in the well so that the hydrocarbons may flow in a controlled manner from the formation, into the lined well bore, and through the production tubing up to the surface for storage or transport.

Hydrocarbons, however, are not always able to flow easily from a formation to a well. Some subsurface formations, such as sandstone, are very porous. Hydrocarbons can flow easily from the formation into a well. Other formations, however, such as shale rock, limestone, and coal beds, are only minimally porous. The formation may contain large quantities of hydrocarbons, but production through a conventional well may not be commercially practical because hydrocarbons flow though the formation and collect in the well at very low rates. The industry, therefore, relies on various techniques for improving the well and stimulating production from formations. In particular, various techniques are available for increasing production from formations which are relatively nonporous.

Perhaps the most important stimulation technique is the combination of horizontal wellbores and hydraulic fracturing. A well will be drilled vertically until it approaches a formation. It then will be diverted, and drilled in a more or less horizontal direction, so that the borehole extends along the formation instead of passing through it. More of the formation is exposed to the borehole, and the average distance hydrocarbons must flow to reach the well is decreased. Fractures then are created in the formation which will allow hydrocarbons to flow more easily from the formation.

Fracturing a formation is accomplished by pumping fluid, most commonly water, into the well at high pressure and flow rates. Proppants, such as grains of sand, ceramic or other particulates, usually are added to the fluid along with gelling agents to create a slurry. The slurry is forced into the formation at rates faster than can be accepted by the existing pores, fractures, faults, vugs, caverns, or other spaces within the formation. Pressure builds rapidly to the point where the formation fails and begins to fracture. Continued pumping of fluid into the formation will tend to cause the initial fractures to widen and extend further away from the wellbore, creating flow paths to the well. The proppant serves to prevent fractures from closing when pumping is stopped.

A formation rarely will be fractured all at once. It typically will be fractured in many different locations or zones and in many different stages. Fluids will be pumped into the well to fracture the formation in a first zone. Typically, the first zone will be at the bottom or "toe" of the well. After the initial zone is fractured, pumping is stopped, and a plug is installed or otherwise established in the liner at a point above the fractured zone. Pumping is resumed, and fluids are pumped into the well to fracture the formation in a second zone located above the plug. That process is repeated for zones further up the formation until the formation has been completely fractured.

Once the well is fractured, large quantities of water and sand that were injected into the formation eventually must be allowed to flow out of the well. The water and sand will be separated from hydrocarbons produced by the well to protect downstream equipment from damage and corrosion. The production stream also may require additional processing to neutralize corrosive agents in the stream.

Systems for successfully completing a fracturing operation, therefore, are extensive and complex, as may be appreciated from FIG. 1. FIG. 1 illustrates schematically a common, conventional frac system. Water from tanks 1 and gelling agents dispensed by a chemical unit 2 are mixed in a hydration unit 3. The discharge from hydration unit 3, along with sand carried on conveyors 4 from sand tanks 5 is fed into a blending unit 6. Blender 6 mixes the gelled water and sand into a slurry. The slurry is discharged through low-pressure hoses 7 which convey it into two or more low-pressure lines 8 in a frac manifold 9. The low-pressure lines 8 in frac manifold 9 feed the slurry to an array of pumps 10, perhaps as many as a dozen or more, through low-pressure "suction" hoses 11.

Pumps 10 take the slurry and discharge it at high pressure through individual high-pressure "discharge" lines 12 into two or more high-pressure lines or "missiles" 13 on frac manifold 9. Missiles 13 flow together, i.e., they are manifolded on frac manifold 9. Several high-pressure flow lines 14 run from the manifolded missiles 13 to a "goat head" 15. Goat head 15 delivers the slurry into a "zipper" manifold 16 (also referred to by some as a "frac manifold"). Zipper manifold 16 allows the slurry to be selectively diverted to, for example, one of two well heads 17 which control flow into and out of the well. Once fracturing is complete, flow back from the fracturing operation discharges into a flowback manifold 18 which leads into flowback tanks 19.

Frac systems are viewed as having "low-pressure" and "high-pressure" sides or, more simply, as having low sides and high sides. The low side includes the components upstream of the inlet of pumps 10, e.g., water tanks 1, hydration unit 3, blending unit 6, and the low-pressure lines 8 of frac manifold 9, which operate under relatively low pressures. The high side includes all the components downstream of the discharge outlets of pumps 10, e.g., the high-pressure missiles 13 of frac manifold 9 and flow lines 14 running to goat head 15, which operate under relatively high pressures.

The larger units of a frac system are transported to a well site on skids, trailers, or trucks and then connected by one kind of conduit or another. The conduits on the low-pressure side typically will be flexible hoses, such as blender hoses 7 and suction hoses 11. On the other hand, flow lines 14 running to goat head 15 and other high-pressure side conduits will be subject to extremely high pressures. They must be more rugged. They also typically will be assembled on site.

Flow lines 14 and other portions of the high-side that are assembled on site are made up from a variety of components often referred to as "frac iron," "flow iron," or "ground iron." Such components include sections of straight steel pipe, such as pup joints. They also include various fittings, such as tees, crosses, laterals, and wyes, which provide junctions at which flow is split or combined. In addition to junction fittings, flowline components include fittings which are used to alter the course of a flow line. Such directional fittings include elbows and swivel joints. High-pressure flow lines also incorporate gauges and other monitoring equipment, as well as control devices such as shut off, plug, check, throttle, pressure release, butterfly, and choke valves.

Because frac systems are required at a site for a relatively short period of time, frac iron components often are joined by unions. Unions allow the components to be connected ("made up") and disconnected ("broken down") relatively quickly. The three types of unions commonly used in frac systems are hammer (or "Weco®") unions, clamp (or "Greyloc®") unions, and flange unions. Though spoken of in terms that may imply they are discreet components, unions are actually interconnected subassemblies of the components joined by the union. A male sub will be on one component, and a mating female sub will be on the other. The subs then will be connected to each other to provide the union.

Flange unions may be made up and broken down with relative ease. Their basic design is robust and reliable, and like other flowline components, they are manufactured from heavy, high tensile steel. Thus, they have been adapted for low pressure (1,000 to 2,000 psi), medium pressure (2,000 to 4,000 psi), and high pressure service (6,000 to 20,000 psi). Moreover, unlike hammer and clamp unions, flange unions do not rely on seals that are exposed to fluids passing through the union.

Flange unions, as their name implies, typically provide a connection between two flanged components, such as spooled pipe or simply "spools." Spooled pipe is provided with annular flanges extending radially outward from each end, thus giving the pipe the appearance of a spool. The flanges provide flat surfaces or faces which allow two spools to mate at their flanges. The flanges also are provided with a number of bolt holes. The holes are arranged angularly around the flange. Thus, spooled pipes may be connected by bolting mating flanges together. Each flange will have an annular groove running concentrically around the pipe opening. An annular metal seal is carried in the grooves to provide a seal between the flanges.

Though not entirely apparent from the schematic representation of FIG. 1, it will be appreciated that conventional frac systems are assembled from a very large number of individual components. Assembly of so many units on site can be time consuming, expensive, and hazardous. Thus, some components of a frac system are assembled off site on skids or trailers and transported as a unit to the well site.

Commonly skidded units include not only process units, such as blender 6 and pumps 10, but also flow units. Frac manifold 9, for example, is an assembly of pipes, junctions, valves, and other flowline components that typically are assembled off-site. Collectively, they provide a flow unit that manifolds, distributes, and controls discharge from pumps 10. Zipper manifold 16 is another flow unit that at times is assembled off-site from separate flowline components. Zipper manifold 16 receives flow from flow lines 14 and selectively distributes it to multiple well heads 17. Such units may have been assembled on site in the past. By skidding them, or mounting them on a trailer, assembly time at the well site is greatly reduced. Moreover, the components typically may be assembled more efficiently and reliably, and may be tested more easily in an off-site facility.

At the same time, because they are transported as a unit, trailered and skidded units are subject to spatial constraints that typically are not so severe as on site. Frac trailers, for example, have multiple flow lines incorporating a large number of flowline components, both on the high-pressure side and the low-pressure side. Multiple flow lines are manifolded. Providing all of those flow lines and manifolds on a trailer which meets highway regulatory requirements often results in a complex, cluttered design which may be difficult or impossible to service on site.

A well head also is fixed. Trailered and skidded units can be quite large, heavy, and moveable only with difficulty and limited precision. Flow lines, therefore, necessarily incorporate directional fittings, such as elbows and swivel joints, which allow its course to be altered to accommodate two unaligned units.

Elbow joints are simply curved sections of pipe which provide, for example, a 90° turn in a line. Swivel joints most commonly are an assembly of elbow conduits, usually three, with rotatable joints. The joints are packed with bearings, typically ball bearings, which allow the elbow conduits to rotate relative to each other. Swivel joints, therefore, can accommodate varying degrees of misalignment between the components which they connect and can provide considerable flexibility in assembling a flow line between essentially immovable points.

Though much less common, swivel flanges also are used to provide similar flexibility. Swivel flanges have a flange mounted on a hub. The hub is formed, for example, at one end of a length of pipe. Bearings, usually roller bearings, are packed around the hub, and the flange can rotate around the hub on the bearings. When joined together, a pair of swivel-flanged pipes and a pair of elbow joints, like swivel joints, can accommodate varying alignments between components to be joined. Consequently, it is rare, if ever, that the high-side of a frac system does not incorporate at least one or, more likely, multiple swivel joints or swivel flanges.

The large number of individual components in a frac system is compounded by the fact that most conventional frac systems incorporate a large number of relatively small flow lines, typically 3" and 4" flow lines. In part that is unavoidable. The pumps cannot be deployed in series and the flow lines carrying their individual discharges must be manifolded. Likewise, if multiple wells are to be serviced by the same array of pumps without assembling and disassembling flow lines, at some point their collective discharge must be split or directed into different flowline segments.

On the other hand, multiple flow lines in many instances represent a design choice. That is, certain flow rates and pressures will be required to fracture a particular well. Those flow rates and pressures will determine the number and capacities of the pumps. The high-pressure side then is designed to deliver the required flow rate without exceeding a maximum or "erosional" flow velocity, typically about 40'/sec, through the system. Additional flow lines often are added to provide higher flow rates into a well. The net result is that a fracking system often is so complicated that it resembles to the uninitiated a tangled mass of spaghetti.

Efforts have been made to simplify the flow line by incorporating fewer segments. For example, the conventional frac system illustrated in FIG. 1 includes four flow lines 14 running from the high-pressure lines 13 of frac manifold 9 to goat head 15. Some frac systems now employ a single, larger flowline segment running in place of four smaller lines. A single larger flow line will incorporate fewer parts and, therefore, fewer potential leak points. Both in terms of direct material and labor costs, a single larger flow line often will be less expensive than multiple smaller lines.

Frac jobs also have become more extensive, both in terms of the pressures required to fracture a formation and the time required to complete all stages of an operation. Prior to horizontal drilling, a typical vertical well might require fracturing in only one, two or three zones at pressures usually well below 10,000 psi. Fracturing a horizontal well, however, may require fracturing in 20 or more zones. Horizontal wells in shale formations such as the Eagle Ford shale in South Texas typically require fracturing pressures of at least 9,000 psi and 6 to 8 hours or more of pumping. Horizontal wells in the Haynesville shale in northeast Texas and northwest Louisiana require pressures around 13,500 psi. Pumping may continue near continuously—at flow rates of 2 to 3 thousand gallons per minute (gpm)—for several days before fracturing is complete.

Moreover, at least in the early stages of production, the flow back after fracturing also will be at high pressure and flow rates. The initial production stream from a fractured well flows at pressures in the range of from 3,000 to 5,000 psi, and more and more commonly up to 10,000 psi. The flow rates can approach a million cubic feet per hour or more.

Given the high number of components, leaking at unions is always a concern in frac systems. The unions may not always be assembled properly. Even when assembled to specification, however, such issues are exacerbated by the extremely high pressures and flow rates through the system. Many unions also incorporate elastomeric seals which are exposed to flow through the conduit and are particularly susceptible to leaking.

Moreover, the abrasive and corrosive nature of the slurry flowing through a frac system not only will accelerate deterioration of exposed elastomeric seals, it can rapidly erode and weaken conduit walls. Flow through relatively long straight sections of pipe is relatively laminar. Flow through other areas, however, such as unions where exposed seals often are present, may be quite turbulent. Erosion also is a more significant issue where a flow line changes direction. Flow will more directly impact conduit walls, causing more abrasion than that caused simply by fluid passing over the walls. The flowlines in conventional frac manifolds, in particular, typically have numerous, relatively sharp turns which are susceptible to damage.

The high pressures and flow rates of fluid flowing through the system also typically will create vibration throughout the system. The vibration can be profound. It tends to create bending stress through the system which can exacerbate leakage, especially at unions. The effects of accumulated stress over periods of time also can accelerate corrosion and erosion of flowline components.

Flowline components also are quite expensive. Swivel joints in particular are expensive and often comprise the single largest part expense of a high-side flow line. At the same time, the general issues discussed above seem to be more focused in respect to swivel joints. Swivel joints often incorporate exposed elastomeric seals. Flow through swivel joints is relatively turbulent. Because they incorporate rotatable joints and connect unaligned components, swivel joints are particularly susceptible to bending stress caused by vibration in the flow line. They also may be disassembled on site for service and may not always be reassembled to specification.

Any failure of flowline components on site may interrupt fracturing, potentially reducing its effectiveness and inevitably increasing the amount of time required to complete the operation. Catastrophic failure may endanger service personnel. Thus, flowline components must be certified and periodically recertified as complying with rated specifications. The harsh operating conditions to which they are exposed, however, may cause damage or weakening of the components which is difficult to detect, such as fatigue stress and microscopic fracturing. Thus, flow iron typically must be disassembled and inspected off-site.

In any event, the cost of repeatedly recertifying or replacing components can add significantly to operating costs of the system. Thus, high-pressure flowline components are required to endure extremely abrasive fluids flowing at extremely high pressures and rates and, hopefully, to do so over an extended service life.

Finally, even frac iron components which may be viewed as relatively small, such as a flanged spool or a junction fitting, are extremely heavy. They must be handled by mechanical lifts, either in the shop or on a site. Positioning the components to allow their unions to be made up or broken down can be difficult and can create a risk of injury to workers.

The statements in this section are intended to provide background information related to the invention disclosed and claimed herein. Such information may or may not constitute prior art. It will be appreciated from the foregoing, however, that there remains a need for new and improved frac manifolds and high-pressure flow lines and flowline components. Likewise, there is a need for new and improved methods of assembling flow lines and fluid transportation systems. Such disadvantages and others inherent in the prior art are addressed by various aspects and embodiments of the subject invention.

SUMMARY OF THE INVENTION

The subject invention, in its various aspects and embodiments, relates generally to fluid transportation systems and flow lines used in those systems and encompasses various embodiments and aspects, some of which are specifically described and illustrated herein. One broad embodiment provides for missile flow lines which may be incorporated into frac manifolds, especially trailered or skidded frac manifolds. The missiles manifold the discharge from a plurality of pumps and comprise at least two junction fittings joined by spooled pipe. The junction fittings comprise a body having a primary bore and at least two feed bores. The primary bore extends axially through the body between first and second primary faces. The primary faces are union faces adapted for connection to a flowline component by a flange union. The feed bores extend radially through the body from a feed face to an intersection with the primary bore. The feed faces also are union faces adapted for connection to a flowline component by a flange union. The intersections of the feed bores with the primary bore are offset axially from each other along the primary bore. The junction fittings are joined by flange unions to at least one spooled pipe such that the junction fittings and spooled pipe form a conduit including the primary bores. A discharge line from a pump may be joined to each feed union face of the junction fittings by a flange union. Thus, the discharge from the pumps may be manifolded into the conduit.

Additional embodiments provide such missiles where the ratio of the minimum width of the body of the junction fitting to the maximum width of the primary bore in the junction fitting is at least about 3 to 2, preferably at least about 2 to 1, and more preferably at least bout 3 to 1. Similar embodiments provide missiles where the junction fittings have a generally cylindrical body and the ratio of the diameter of the fitting body to the diameter of the primary bore is at least about 3 to 2, preferably at least about 2 to 1, and more preferably at least about 3 to 1.

Other aspects and embodiments provide such missiles where at least one feed bore forms a long-sweep curve into the primary bore, preferably a long-sweep curve having a sweep ratio of from about 1.25 to about 8. Still other embodiments provide such missiles where the feed bores are straight-line bores.

In other aspects, the missiles may have feed bores intersecting with the primary bore at an angle of approximately 900, or at an interior angle of about 45°, or at an interior angle of from about 15° to about 60°.

Still other embodiments provide such missiles where the missile conduit has an inner diameter about equal to or greater than at least about 5 inches or at least about 7 inches.

Yet other embodiments provide such missiles where the junction fitting has a weep port extending from the primary faces or the feed faces to the exterior of the junction fitting.

Additional embodiments provide missiles having a ported flange joined to the upstream-most junction fitting of the missile. Other embodiments provide missiles having a flush-port assembly joined to the upstream end junction fitting and comprising a ported flange having a union sub.

Additional embodiments provide such missiles where the fitting body has a generally cylindrical configuration, where the body is machined from a cylindrical bar, where the fitting body has a generally polyhedral configuration, or where the fitting body has a generally prismatic configuration.

Still other embodiments provide frac manifolds which are mounted on a skid or trailer and comprise various embodiments of the novel missiles, preferably a single such missile, and at least one low-pressure suction line. Other embodiments include high-pressure fluid transportation system comprising various embodiments of the novel missiles. Embodiments also include methods of assembling a high-pressure fluid transportation system where the method comprises assembling a novel missile into the system by connecting it to a flowline component by a flange union.

In other aspects and embodiments, the invention provides fluid transportation systems for fracturing a well. The systems comprise a missile adapted to manifold the discharge from a plurality of pumps. A flow line is connected to the missile. A wellhead assembly is connected to the flowline. A liner extends into the well and is in fluid communication with the wellhead assembly. The inner diameter of the missile and the flow line have diameters about equal to or greater than the inner diameter of the liner.

Other embodiments provide such frac systems where the liner has an inner diameter about equal to or greater than 5 inches, or where the line has an inner diameter about equal to or greater than 7 inches.

Additional embodiments provide such frac systems where the missile has a flush port in its upstream end allowing fluid to be introduced into the missile.

In still other aspects and embodiments, the invention provides frac manifolds comprising a frame. The frame comprises two lateral beams joined by cross-members. A single missile adapted to manifold the discharge from a plurality of pumps is mounted on the frame.

Further embodiments provide such frac manifolds where at least a portion of the frame is adapted to rest on a site pad or where at least a portion of the lateral beams rest on the site pad.

Yet other embodiments provide such frac manifolds where the lateral beams are at least as long as the missile.

In other embodiments of the frac manifold, the missile is coupled to both lateral beams. In other embodiments the missile is coupled to the frame by a plurality of mounts. The missiles are coupled to the mounts, and the mounts are coupled to the frame.

Additional embodiments provide such frac manifolds where the missile comprises junction fittings having a generally cylindrical body. The mounts comprise a pedestal and a cradle. The mounts are coupled to the frame. The cradles are adapted to receive the junction fittings and to restrict transverse movement of the junction fittings.

In other embodiments the length of the cradle is at least about 50% or, preferably at least about 80% of the length of the junction fittings. Other embodiments provide such frac manifolds where the pedestal of the mounts extends at least partially over both the lateral beams and is coupled thereto.

Additional embodiments provide such frac manifolds where the mounts comprise a base extending horizontally between said lateral beams and a standard supporting said missile. The standard extends across the base and at least partially across the lateral beams. In other embodiments the pedestal comprises a base that extends horizontally between the lateral beams and a standard. The standard supports the cradle and extends across the base and at least partially across the lateral beams.

In still other embodiments the frame is incorporated into a trailer. In other embodiments the frame comprises a plurality of vertically adjustable, jackup legs adapted to raise and lower the frame. Yet other embodiments provide such frac manifolds where the jackup legs comprise a vertical lifter and where the vertical lifter is attached to a horizontal extender.

Other aspects and embodiments of the invention provide frac manifold modules. The manifold modules comprise a frame. The frame supports a missile adapted to manifold the discharge from a plurality of pumps as well as a suction line or a pair of suction lines adapted to distribute flow to the plurality of pumps. The manifold module lacks a suction manifold distributing flow to the suction lines.

Additional embodiments provide such manifold modules where the missile is adapted for connection at its downstream end to a flow line or to a missile on a first other frac manifold. The missile is adapted for connection at its upstream end to a missile on a second other manifold.

Other embodiments provide frac manifold systems. The manifold systems comprise a first and second manifold module. Each manifold module comprises a frame and a single missile providing a straight flow line adapted to manifold the discharge from a plurality of pumps. The missile on the first module is joined to the missile on the second module. Other embodiments provide such manifold systems where the missiles on the first and second modules are aligned to provide a straight flow line.

Still other embodiments provide such manifold systems where the first and second modules comprise a pair of suction lines. The first module comprises a suction manifold adapted to distribute flow to the suction lines. The second module lacks a suction manifold. The suction lines on the first module are connected to the suction lines on the second module.

Additional embodiments provide such manifold systems where at least one of the manifold modules comprise levelers adapted to align the missiles. Other embodiments provide such modules which comprise a plurality of vertically adjustable, jackup legs adapted to raise and lower the frame. The jackup legs may comprise a vertical lifter. The vertical lifter may be attached to a horizontal extender.

In other aspects and embodiments, the invention provides methods for transporting frac manifolds to and from a site. The method comprises loading the frac manifold on a trailer and transporting the trailer to a site. Jackup legs on the frac manifold then are actuated to elevate the frac manifold above the trailer. The trailer then is moved out from under the frac manifold.

In other aspects and embodiments, the invention provides for flow line assemblies mounted on a frame. The assemblies comprise a flow line having a plurality of components joined by unions along a common axis. The unions allow the components to be made up and broken down. The components are releasably coupled to the frame to restrict movement along the axis. When they are uncoupled from the frame, they are adapted to translate relative to the frame along the axis. The assemblies also comprise a shifter. The shifter is adapted for selective coupling to the components and for movement along the axis. The shifter may be actuated to shift a first component relative to a second component along the axis. The first component is uncoupled from the frame and coupled to the shifter. The shifter then is actuated.

Other embodiments provide such assemblies where the flow line is a missile and the components comprise cross junction fittings. In other embodiments the components are coupled to the frame by a mount. The components are fixedly coupled to the mount, and the mounts are releasably coupled to the frame. The shifter and the mounts may be selectively coupled. In still other embodiments the mount comprises a pedestal releasably coupled to the frame and a cradle adapted to receive the cylindrical body.

Additional embodiments provide such assemblies where the frame has at least two lateral beams joined by crossmembers. The mount is releasably coupled to the lateral beams and is adapted to slide along the beams when the shifter is actuated. In other embodiments a bearing element is disposed between the mount and the frame.

In still other embodiments the assembly comprises a hydraulic cylinder coupled to the shifter.

In other aspects and embodiments, the invention provides methods of breaking down a flow line with a shifter mounted on a frame. The flow line comprises a plurality of components joined by unions along a common axis. The unions allow the components to be made up and broken down. The components are releasably coupled to the frame to restrict movement along the axis and, when released, adapted to translate relative to the frame along the axis. The method comprises unjoining a first component from a second component. The second component is uncoupled from the frame. The shifter is then actuated to move the second component on the frame along the axis away from the first component.

In still other aspects and embodiments, the invention provides methods of making up a flow line with a shifter mounted on a frame. The flow line comprises a plurality of components joined by unions along a common axis. The unions allow the components to be made up and broken down. The components are releasably coupled to the frame to restrict movement along the axis and, when released, adapted to translate relative to the frame along the axis. The method comprises placing a first component and a second component on the frame. The shifter is actuated to move the second component on the frame along the axis toward the first component. The first and second components then are joined.

Yet other aspects and embodiments of the invention provide assemblies for manifolding the discharge from a plurality of pumps. The assemblies comprise a missile and a connection arm. The missile comprises a conduit adapted to receive flow from the pumps through feed inlets. The connection arm comprises a swivel joint. The connection arm is joined at one end to a feed inlet. Its other end is adapted to be joined to a discharge line from a pump by a union. The assemblies also comprise an adjustable support. The adjustable support engages a horizontal portion of the connection arm proximate to the feed inlet. The adjustable supported is adapted for vertical adjustment.

Other embodiments provide such assemblies where the support comprises a cradle, a base, and a vertically adjustable connector. The cradle supports the horizontal portion of the connection arm. The vertically adjustable connector extends between the cradle and the base and is adapted to raise or lower the cradle relative to the base. In other embodiments the connector is a threaded shaft.

Other embodiments and aspects of the invention provide frac manifolds comprising a frame. The frame supports a low-pressure suction line adapted to supply fluid to a plurality of pumps, a missile adapted to manifold the discharge from the plurality of pumps, a hydraulic system comprising a hydraulic actuator and an electrically powered hydraulic pump, an electric generator, and an internal combustion engine adapted to power the electric generator. In other embodiments the engine is a gasoline powered engine. In still other embodiments the hydraulic actuator drives jackup legs.

Other aspects and embodiments of the invention provide offset lateral cross junction fittings for flow lines. The junction fittings are adapted to manifold the discharge from a plurality of pumps and comprise a body having a primary bore and at least two feed bores. The primary bore extends axially through the body between first and second primary union faces. The union faces are adapted for connection to a flowline component by a flange union. The feed bores extend through the body from a feed union face to an intersection with the primary bore. The feed union faces are adapted for connection to a component of a discharge line from a the frac pump by a flange union. The intersection between the feed bores and the primary bore has an interior angle of substantially less than 90° and the intersections of the feed bores are offset axially from each other.

Additional embodiments provide such fittings where the body is cylindrical, where the body is machined from a cylindrical bar, where the body is polyhedral.

In other aspects, the invention provides such junction fittings where at least one feed bore forms a long-sweep curve into the primary bore, preferably where the feed bore has a sweep ratio of from about 1.25 to about 8. Other embodiments provide such fittings where the feed bores intersect with the primary bore at an interior angle of about 45° or at an interior angle of from about 15° to about 60°.

Further embodiments provide such fittings which have a weep port extending from the primary faces or the feed faces to the exterior of the fitting.

Still other embodiments provide flow lines for a high-pressure fluid transportation system. The flow lines comprise various embodiments of the novel flowline fittings. The flowline fittings are assembled into the flow line by flange unions and connected to discharge lines from the pumps by flange unions. Other embodiments provide high-pressure fluid transportation systems which comprise various embodiments of the novel flow lines. Additional embodiments provide skidded or trailered frac manifolds comprising various embodiments of the novel flowline fittings and at least one low-pressure line. Other embodiments provide methods of assembling a flow line for a high-pressure fluid transportation system. Various embodiments of the novel flowline fittings are assembled into the flow line by connecting them to a flowline component by a flange union.

Other aspects and embodiments of the invention provide feed fittings with long-sweep curves. The feed fittings are adapted to combine the flow from at least two flowlines and comprise a body having a straight-line primary bore and a feed bore. The primary bore extends axially through the body between first and second primary union faces. The union faces are adapted for connection to a flowline component by a flange union. The feed bore extending through the body from a feed union face to an intersection with the primary bore. The feed union face is adapted for connection to a flowline component by a flange union. The feed bore forms a long sweep curve into the primary bore.

Other embodiments provide such feed fittings where the feed bore has a sweep ratio of from about 1.25 to about 8. Still other embodiments provide such fittings where the feed bore intersects with the primary bore at an angle of approximately 900, where the feed bore intersects with the primary bore at an interior angle of about 45°, or where the feed bore intersects with the primary bore at an interior angle of from about 15° to about 60°. Additional embodiments provide such feed fittings where the fitting comprises a second the feed bore.

Further embodiments provide such fittings which have a weep port extending from the primary faces or the feed faces to the exterior of the fitting.

Further aspects and embodiments provide flow lines for a high-pressure fluid transportation system which comprise various embodiments of the novel feed fittings. Still other embodiments provide high-pressure fluid transportation systems comprising various embodiments of the novel flow lines. Additional embodiments provide methods of assembling a flow line for a high-pressure fluid transportation system. Various embodiments of the novel feed fittings are assembled into a flow line by connecting the feed fitting to a flowline component by a flange union.

In other embodiments and aspects, the invention provides flowline junction fittings adapted to manifold the discharge from a plurality of pumps. The junction fittings comprise a body having a primary bore and at least two feed bores. The primary bore extends axially through the body. The feed bores extend through the body from a feed union face to an intersection with the primary bore. The feed union face is adapted for connection to a component of a discharge line from a frac pump by a flange union.

Other embodiments provide such fittings where the intersections of the feed bores with the primary bore are offset axially from each other along the primary bore. In yet other embodiments the intersection between the feed bores and the primary bore has an interior angle of substantially less than 90°, and in still other embodiments, the feed bore forms a long sweep curve into the primary bore.

Additional embodiments provide such fittings where the body is cylindrical and where the body is machined from a cylindrical bar.

Still other embodiments and aspects of the invention provide methods of inspecting a flow line in a fluid transportation system. The system injects fluid under high pressure into a well and incorporates a single flow line running from the discharges from a plurality of pumps to a well head. The method comprises running an in-line inspection tool through the single flow line. In other embodiments the in-line inspection tool is selected from the group consisting of cameras, magnetic-flux leakage units, magnetic particle detection units, electromagnetic acoustic transducers, pit gauges, calipers, and 3-D laser units.

In yet other embodiments, the inspection methods comprise flushing the flowline prior to running the in-line inspection tool through the single flow line. In additional embodiments the flow line comprises a missile having a port in its upstream end allowing flush fluid to be introduced into the missile.

Finally, still other aspects and embodiments of the invention provide apparatus and methods having various combinations of such features as will be apparent to workers in the art.

Thus, the present invention in its various aspects and embodiments comprises a combination of features and characteristics that are directed to overcoming various shortcomings of the prior art. The various features and characteristics described above, as well as other features and characteristics, will be readily apparent to those skilled in the art upon reading the following detailed description of the preferred embodiments and by reference to the appended drawings.

Since the description and drawings that follow are directed to particular embodiments, however, they shall not be understood as limiting the scope of the invention. They are included to provide a better understanding of the invention and the manner in which it may be practiced. The subject invention encompasses other embodiments consistent with the claims set forth herein.

BRIEF DESCRIPTION OF THE DRAWINGS

The patent or application file contains at least one drawing executed in color. Copies of this patent or patent application publication with color drawing(s) will be provided by the U.S. Patent and Trademark Office upon request and payment of the necessary fee.

FIG. 3 is a side elevation view of trailer-mounted frac manifold 110 showing missile 113 of frac manifold 110 and a first preferred embodiment of the flowline components of the subject invention, namely, offset cross junction 120 having long sweep feed bores.

FIG. 20A shows jackup legs 311 in a fully retracted position. FIG. 20B shows jackup legs 311 in a fully extend position.

Figure 1:
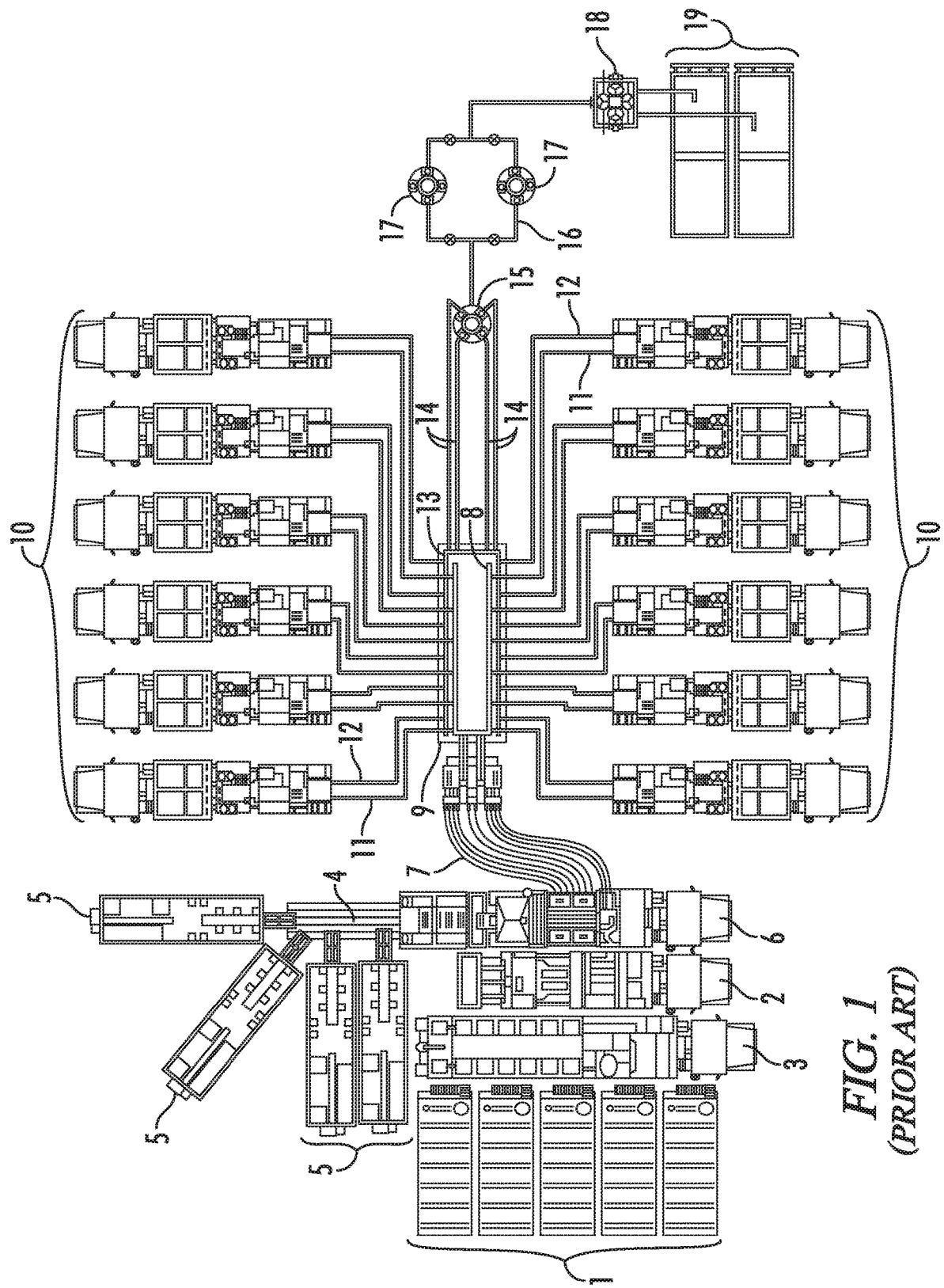
FIG. 1 (prior art) is a schematic view of a system for fracturing a well and receiving flowback from the well, which system includes various high-pressure flow lines, such as flow lines 12 and 14.

In the drawings and description that follows, like parts are identified by the same reference numerals. It also will be apparent from the discussion that follows that certain conventions have been adopted to facilitate the description of the novel systems which typically include large numbers of identical components. For example, as discussed below, various embodiments of the novel missiles include a plurality of identical cross junctions 120. Specific individual cross junctions 120 may be identified in the drawings, or referenced in the discussion as 120a, 120b, 120c, etc. to distinguish a particular junction 120 from another junction 120. The drawing figures also are not necessarily to scale. Certain features of the embodiments may be shown exaggerated in scale or in somewhat schematic form and some details of conventional design and construction may not be shown in the interest of clarity and conciseness. For example, in large part the threaded fasteners used to join flange unions are omitted.

DESCRIPTION OF ILLUSTRATIVE EMBODIMENTS

The invention, in various aspects and embodiments, is directed generally to fluid transportation systems and flow lines used in those systems, and especially to frac trailers, frac manifolds, flow lines, and flowline components that are used to convey abrasive, corrosive fluids under high pressure. Various specific embodiments will be described below. For the sake of conciseness, however, all features of an actual implementation may not be described or illustrated. In developing any actual implementation, as in any engineering or design project, numerous implementation-specific decisions must be made to achieve a developer's specific goals. Decisions usually will be made consistent within system-related and business-related constraints. Specific goals may vary from one implementation to another. Development efforts might be complex and time consuming and may involve many aspects of design, fabrication, and manufacture. Nevertheless, it should be appreciated that such development projects would be routine effort for those of ordinary skill having the benefit of this disclosure.

The novel frac manifolds, flowlines, and flowline components typically will be used to connect process or flow units for temporary fluid transportation systems. They are particularly useful for temporary installations that must be assembled and disassembled on site and which may be installed at various sites. Such systems are common in chemical and other industrial plants, on marine dredging vessels, strip mines, and especially in the oil and gas industry. Frac systems, such as those shown in FIG. 1, are a very common application where temporary high-pressure flow lines are routinely assembled and disassembled at various sites to provide fluid conduits between process or flow units for different wells.

Figure 2:
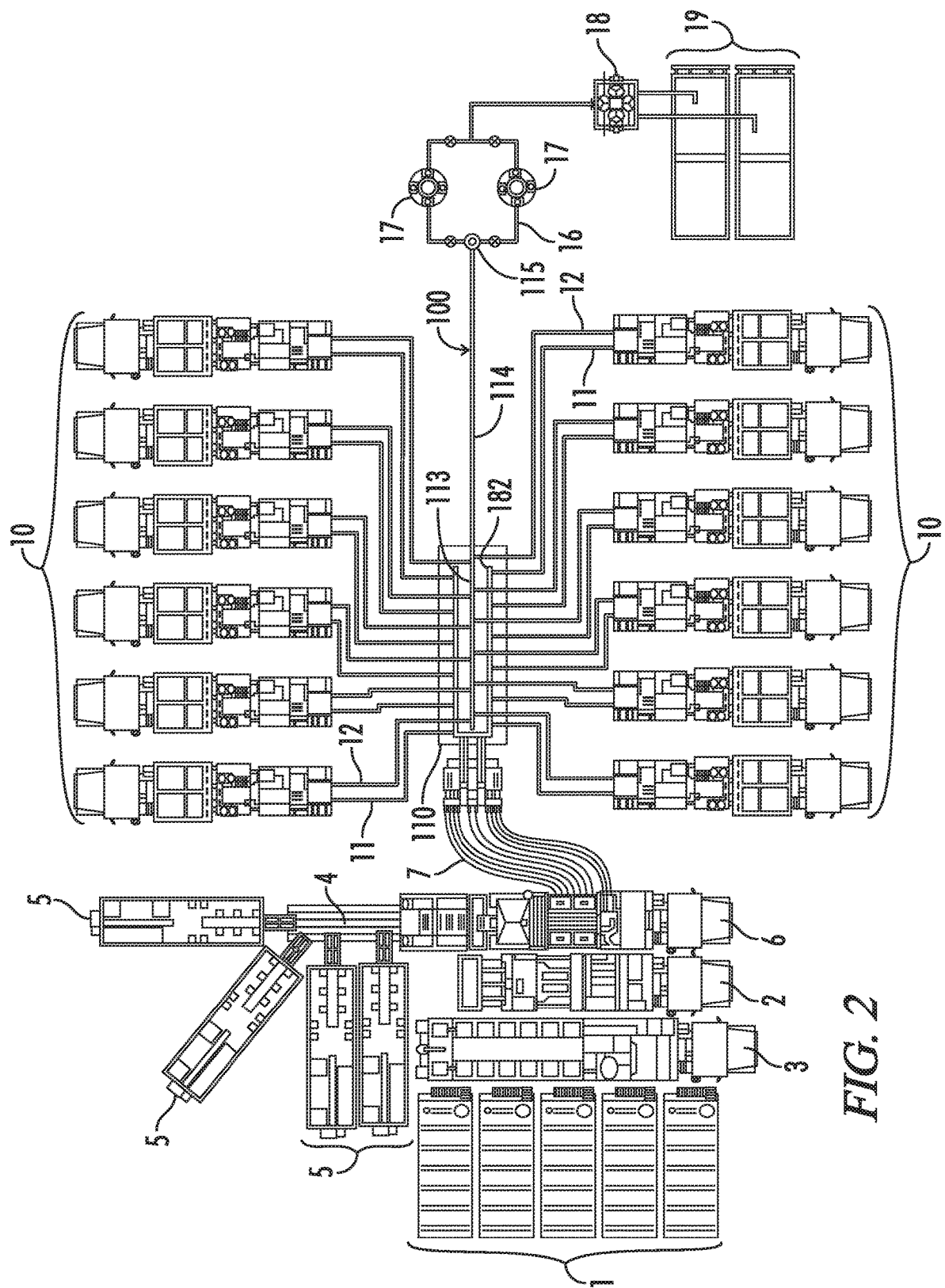
FIG. 2 is a schematic view of a frac system incorporating a first preferred, trailer mounted embodiment 110 of the novel frac manifolds of the subject invention. Missile 113 of frac manifold 110 is coupled to a single flow line 114 running to junction head 115 of zipper manifold 16, thus providing a single high-pressure conduit 100 between pumps 10 and zipper manifold 16.

The novel frac manifolds, flow lines, and flowline components are particularly suited for use in frac systems such as the system shown in FIG. 1. For example, a first preferred embodiment 110 of the frac manifolds of the subject invention is shown schematically in FIG. 2. Frac manifold 110, and the novel frac system shown in FIG. 2, is identical in many respects to frac manifold 9 and the frac system of FIG. 1. It will be noted that frac manifold 9 incorporates a pair of relatively small diameter missiles 13, one on each side of frac manifold 9. The two missiles 13 receive the discharge from pumps 10, are manifolded, and discharge into four relatively small diameter high-pressure flow lines 14 which feed into goat head 15.

In contrast, novel frac manifold 110 incorporates a single missile 113 to which are connected all of the pump discharge lines 12. Missile 113 receives the entire discharge of pumps 10. Single missile 113 in turn discharges into a single flow line 114 running to junction head 115 of zipper manifold 16. Flow line 100, i.e., the assembly of missile 113 and flow line 114, thus provides a single high-pressure conduit between pumps 10 and zipper manifold 16.

Figure 3A:
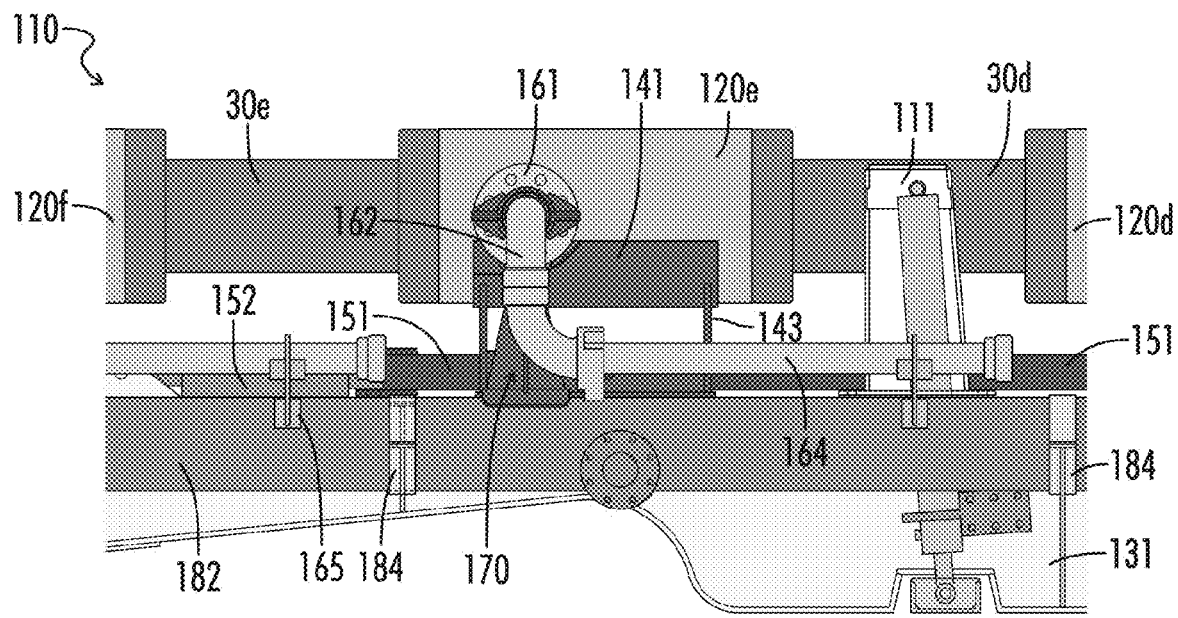
FIG. 3A is an enlarged portion of FIG. 3.
Figure 4A:
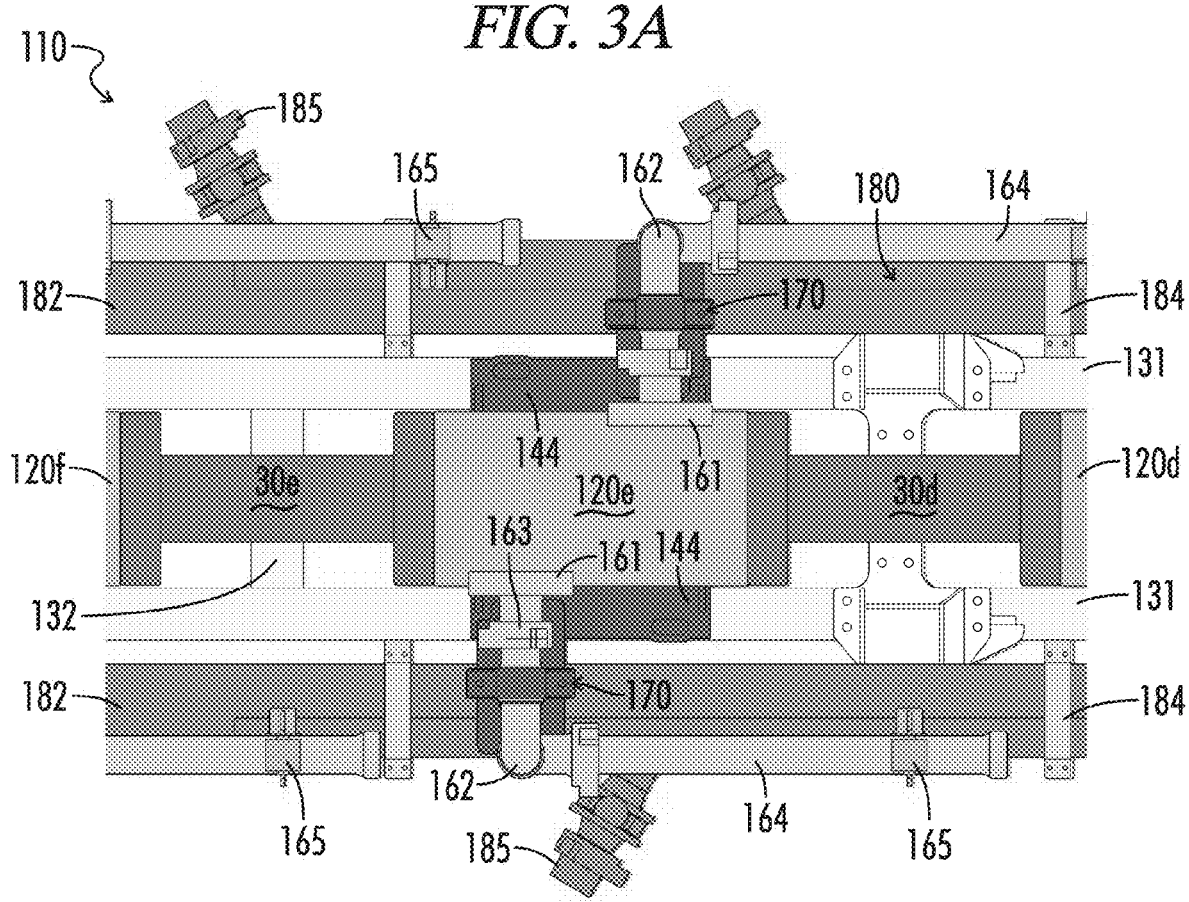
FIG. 4 is a top view of frac trailer 110 shown in FIG. 3, an enlarged portion thereof being shown in FIG. 4A.
Figure 5:
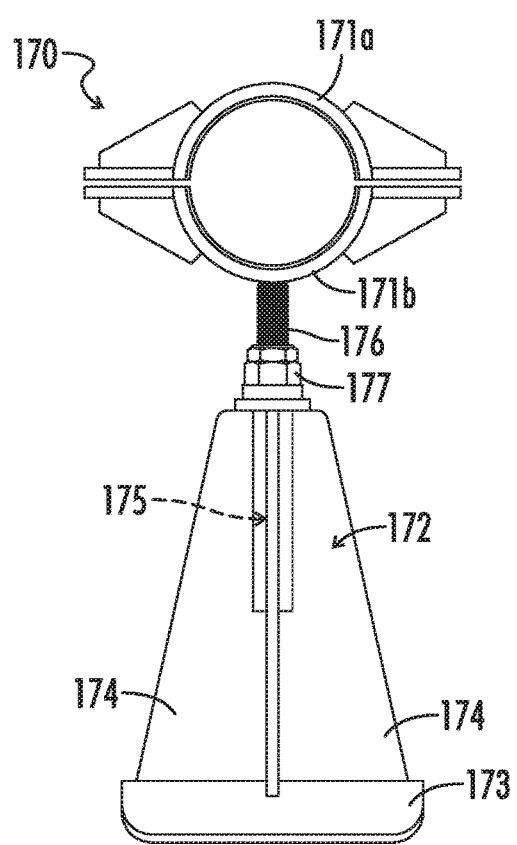
FIG. 5 is a front elevation view of a first preferred embodiment 170 of the novel adjustable feed arm supports, which adjustable support 170 is incorporated into frac trailer 110.
Figure 6:
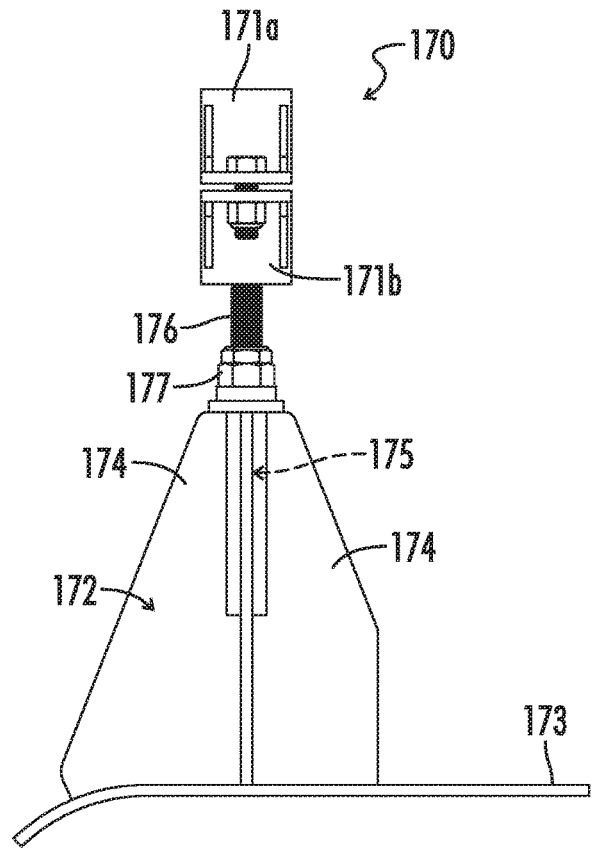
FIG. 6 is a side elevation view of adjustable support 170 shown in FIG. 5.
Figure 7:
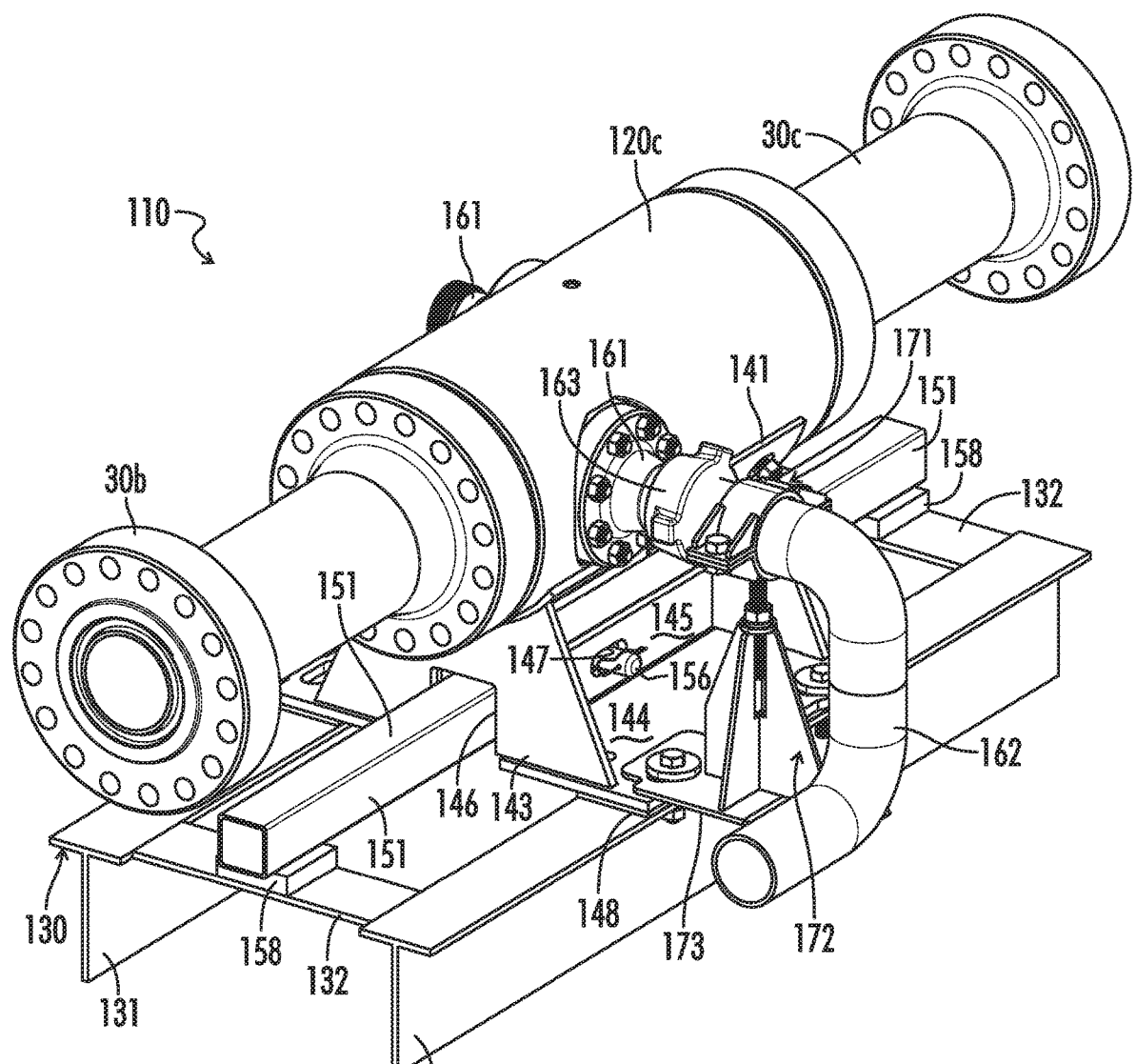
FIG. 7 is a partial, enlarged isometric view, taken generally from above and to the right of frac trailer 110 shown in FIGS. 3-4 with certain components removed to better show adjustable support 170 and a first preferred embodiment 150 of the novel assemblers.
Figure 8:
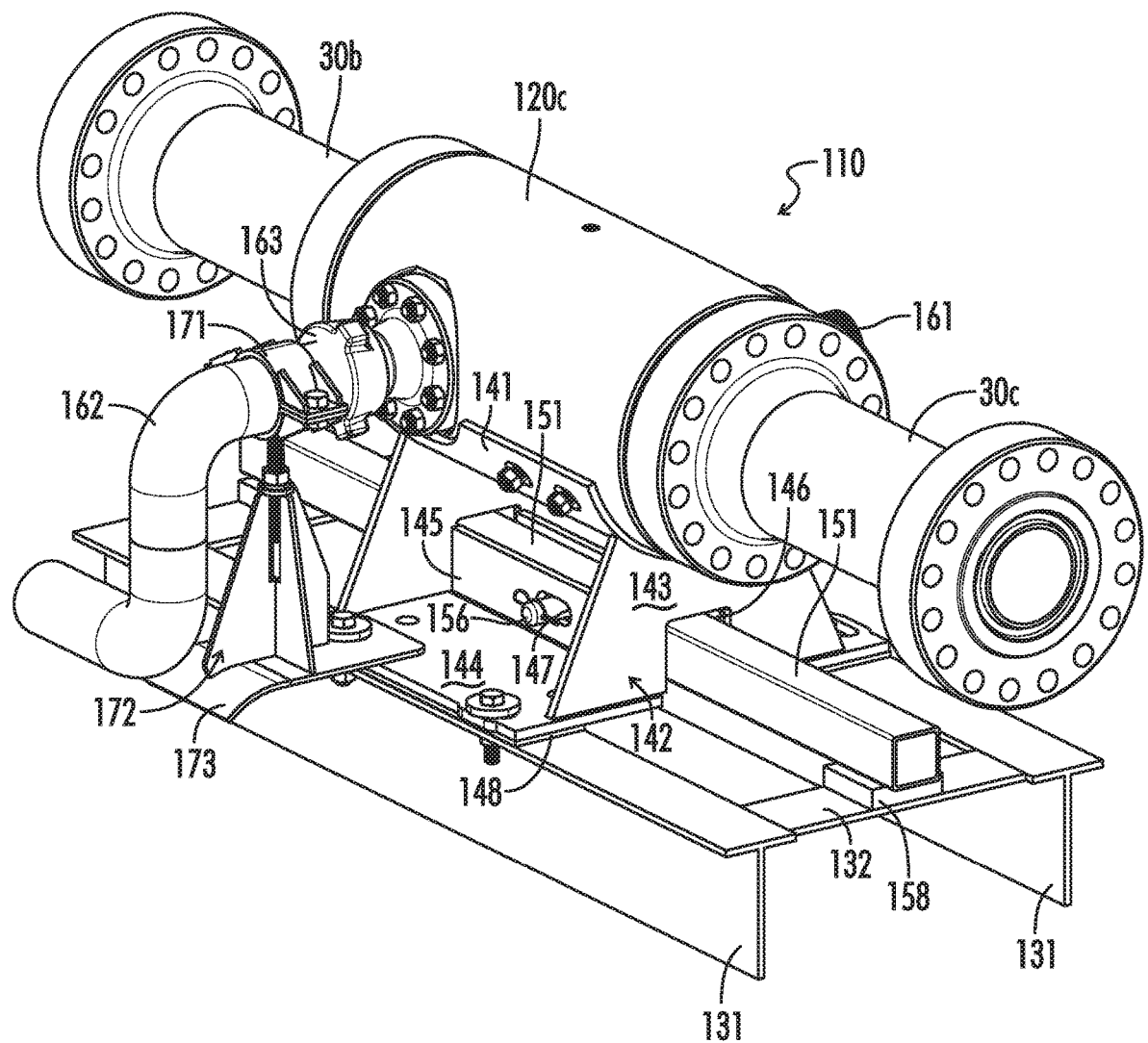
FIG. 8 is another partial, enlarged isometric view, taken generally from above and to the right, of frac trailer 110.
Figure 9:
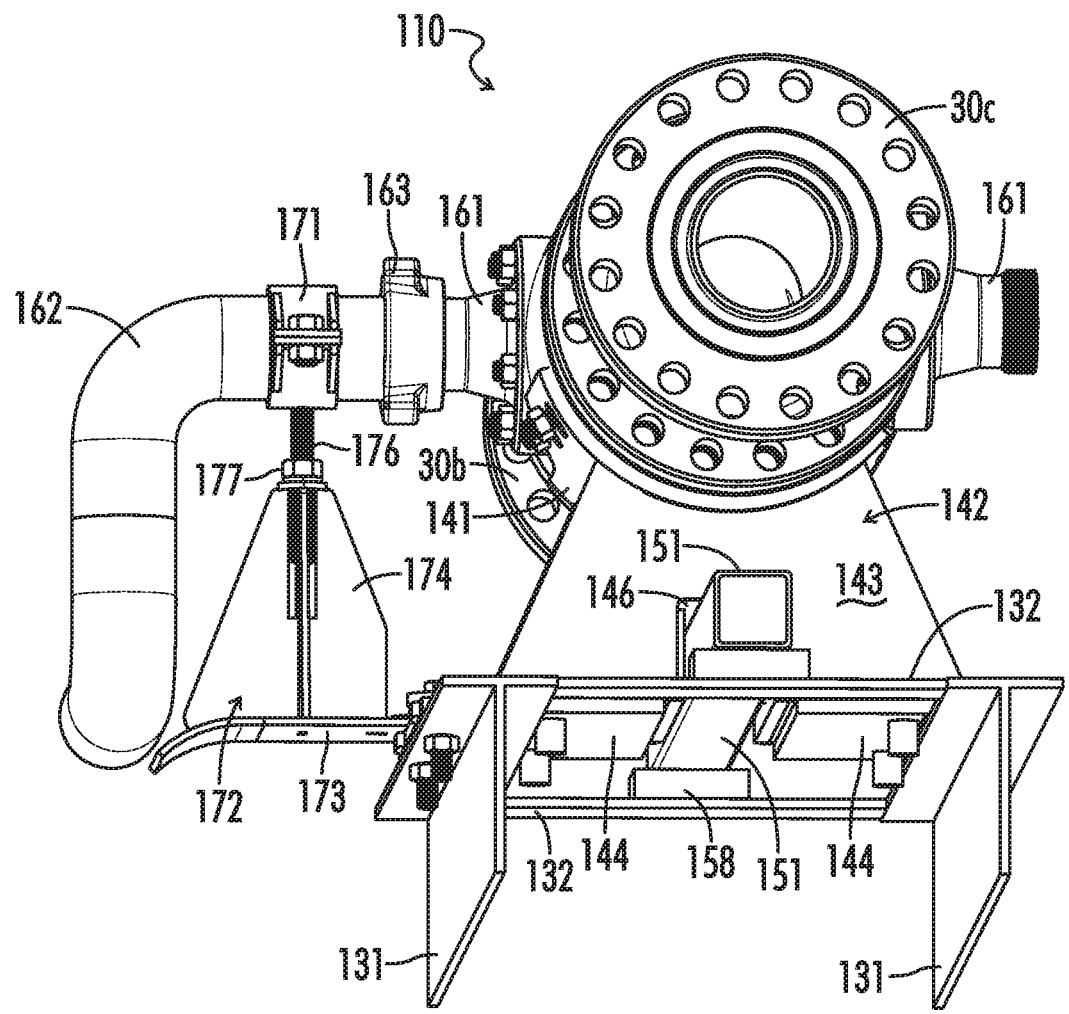
FIG. 9 is another partial, enlarged isometric view, taken generally from below and to the right, of frac trailer 110.

Frac manifold 110 is shown in further detail in FIGS. 3-4. As seen therein, frac manifold 110 is a trailer mounted manifold. It generally comprises a rolling chassis 130, missile 113, a number of missile mounts 140, an assembler 150 for making up and breaking down missile 113, a number of connection arms 160, adjustable mounts 170, and a suction system 180. Suction system 180 receives slurry from blender 6 via blender hoses 7 (not shown in FIGS. 3-4) and distributes it to pumps 10. As noted above, missile 113 receives the high-pressure discharge from pumps 10, manifolds it, and discharges it into flow line 114.

Chassis 130 provides the primary structural framework for frac trailer 110. It is the frame on which missile 113, suction system 180, and the other trailer components are mounted, either directly or indirectly. It includes a pair of lateral beams, such as shaped I-beams 131. I-beams 131 are connected by cross members 132. Structural steel having other configurations, such as C-beams, may be used as well. Chassis 130 is a rolling chassis, and thus includes a suspension system, a wheel assembly, and a hitch assembly. Trailer 110 also preferably is provided with a mechanism for lifting the forward end of chassis 130, such as hydraulic jacks 111. Jacks 111 enable trailer 110 to be more easily hitched to, and unhitched from a tractor as required. It also will be noted that chassis 130 is configured such that when trailer 110 is unhitched, it will rest on the ground. In particular, I-beams 131 will rest on the ground, providing an extensive, stable foot print for trailer 110 when it is in service.

Suction system 180 generally comprises a suction manifold 181 and a pair of suction lines 182. Suction manifold 181 is mounted near the rear of trailer 110. It has a transverse main pipe from which extend two lateral pipes, one on each side of trailer 110. The main pipe of suction manifold 181 is provided with a number of connections, such as female hammer union subs 183, allowing suction manifold 181 to receive and manifold the discharge from blender 6 via blender hoses 7 (not shown in FIGS. 3-4). Suction lines 182 are connected to the lateral pipes of suction manifold 181 by, for example, flange unions. Suction lines 182 may be mounted on chassis 130 along each side of trailer 110 by suitable mounts, and may be mounted permanently, for example, by welds. Preferably, however, they are mounted to allow disassembly from trailer 110. For example, suction lines 182 are mounted on brackets 184 which are spaced along and extend from the side of I-beams 131. Brackets 184 include a cradle and a removeable top clamp or strap. Suction lines 182 thus may be securely held on brackets 184, but may be easily assembled to and disassembled from trailer 110.

Each suction line 182 includes a plurality of outlets. For example, suction lines 182 each have six outlets which are provided with connections, such as female hammer union subs 185. Suction hoses 11 leading to pumps 10 (not shown in FIGS. 3-4) may be connected via hammer unions to hammer union subs 185. Pumps 10 on one side of frac trailer 110 may be connected to one suction line 182, and pumps 10 on the other side may be connected to the other suction line 182. It will be appreciated, of course, that other conventional unions and conduits may be used to make up the connections with blender 6 and pumps 10.

Missile 113 incorporates a first preferred embodiment of the novel flowline components, offset cross junction 120. More specifically, missile 113 has six offset cross junctions 120a-120f which are interconnected by spools 30a-30e. Offset cross junctions 120a-120f, as discussed further below, are connected to an array of pumps 10 via pump discharge lines 12 (not shown in FIGS. 3-4) and connection arms 160. More specifically, each offset cross junction 120a-120f is connected to two pumps 10 positioned on opposite sides of frac trailer 110. They may be referred to as "cross" junctions in that, as described below, they have two feed bores entering a primary conduit. They may be referred to as an "offset" cross junction in that the feed bores are offset axially from each other along the primary conduit.

Figure 12:
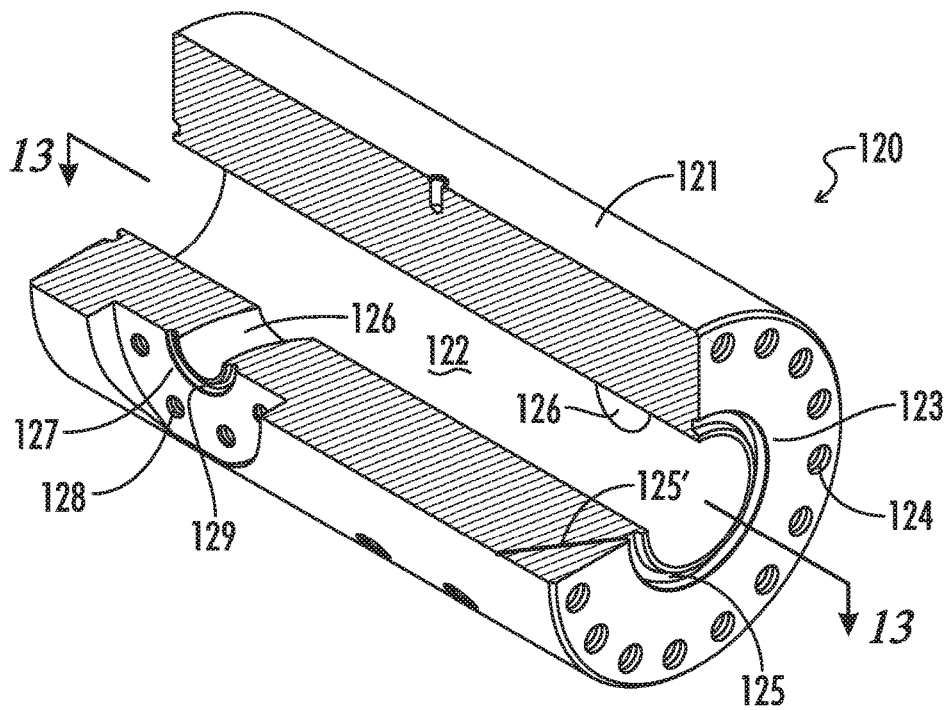
FIG. 12 is an isometric view, with an axial quarter-section removed, of offset cross junction 120 which is assembled into missile 113 of frac manifold 110 shown in FIGS. 3-9.
Figure 13:
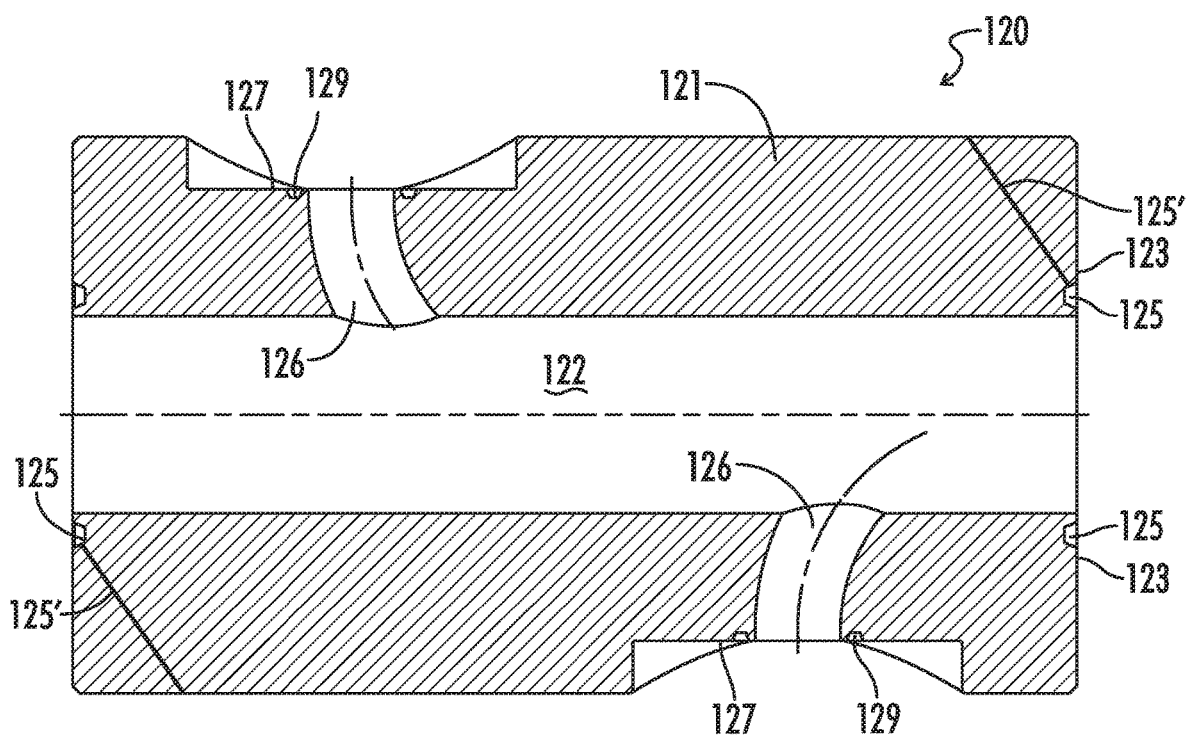
FIG. 13 is a cross-sectional view of offset cross junction 120 shown in FIG. 12.

Offset cross junctions 120 are shown in greater detail in FIGS. 12-13. As seen therein, offset cross junctions 120 have a somewhat elongated, generally cylindrical body 121 having a main or primary bore 122. Bore 122 provides the primary conduit through which slurry passes as it is conveyed towards well head 17. Primary bore 122 extends between opposing, generally parallel, flat surfaces or union faces 123 on each end of body 121. Union faces 123 may be viewed as the primary union faces for junctions 120. The center of bore 122 may be viewed as defining the central axis of offset cross junction 120.

As appreciated from FIG. 12, union faces 123 are provided with, for example, 16 bottomed holes 124. Holes 124 typically are threaded to accept standing bolts or other threaded connectors (not shown). Alternately, holes 124 may be adapted to receive threaded studs (not shown). Holes 124 are arranged angularly about bore 122. When provided with studs or other threaded connectors, mating components, such as spools 30 may be joined to offset cross junctions 120 by a flange-type union. More or fewer holes 124 and connectors may be provided depending upon the size of the union between the components and the pressures for which the union will be rated.

Typically, union faces 123 will be provided with a metal seal (not shown). The seal is disposed in a groove, such as annular groove 125 extending around the openings of bore 122. A seal is generally required to avoid leakage at union faces 123. If desired, weep ports, such as weep port 125', may be provided in cross junctions 120. As seen best in FIG. 12, weep ports 125' are relatively small passageways extending angularly through body 121 of cross junction 120. They extend from seal grooves 125 in union faces 123 to the outer surface of cross junction 120. If there is any leakage around the metal seal and union faces 123, it may be more easily detected by monitoring weep port 125' for any discharge of fluid. Weep port 125' may have other configurations, such as intersecting bores. In any event, weep ports 125' may allow a relatively minor leak to be addressed before developing into a more serious situation.

Also, and though described as "flat" herein, union faces 123 typically will have a very slight annular boss extending upwards around the openings of bore 122. The annular boss will help ensure that the abutment between mating union faces is properly loaded when the union is made up. The designs and features of union faces in particular and flange unions in general are well known, however, and the union faces on junction 120 and the other fittings disclosed herein may be varied in accordance with common practice in the art.

Offset cross junctions 120 also are provided with a pair of bores 126 which provide conduits for feeding discharge from an individual pump 10 into primary bore 122. Feed bores 126 extend inward from flat union faces 127 which are milled or otherwise provided on the outer surface of body 121. Feed union faces 127 are on opposite sides of body 121, i.e., they are spaced 180° about the circumference of body 121, and are generally parallel.

Feed bores 126 lead into and intersect with primary bore 122. It will be noted that bores 126 form what may be referred to as long-sweep curves leading into primary bore 122. As used herein, a "long-sweep" curve, when used in reference to a particular bore or passage, shall be understood as meaning that the sweep ratio of the bore is about 1.25 or greater. The "sweep ratio" in turn shall be understood as the ratio of the radius of the curve to the diameter of the bore in which the curve is formed. The sweep ratio of bores 126 is approximately 2.5.

It also will be noted that feed bores 126 are offset axially from each other. That is, their respective intersections with primary bore 122 are spaced apart along the length or axis of primary bore 122. Thus, feed bores 126 will discharge into primary bore at spaced intersections, one upstream from the other. As discussed further below, providing a long-sweep in feed bores 126, and offsetting the intersections between feed bores 126 and primary bore 122 will help to minimize areas of concentrated erosion in cross junctions 120.

Like primary union faces 123, feed union faces 127 comprise a plurality of holes 128, in this case 8. Mating components may be joined to offset cross junctions 120 by threaded studs or other threaded connectors inserted in holes 128. Feed union faces 127 also will have a metal seal (not shown) disposed in an annular groove 129. Weep ports, similar to weep ports 125', also may be provided between seal grooves 129 and the outer surface of cross junction 120. Like union faces 123, feed union faces 127 may be varied in accordance with common practice in the art.

Offset cross junctions 120a-120f are joined by spools 30a-30e. Spools 30 are conventional spools. As such they comprise a pipe which provides a conduit for conveying fluid between offset cross junctions 120. A pair of flanges are provided at each end of the pipe. The outer flat surfaces of the flanges provide union faces. Each of the flanges is provided with, for example, 16 bolt holes extending through the flanges. The holes are adapted to accommodate the passage of threaded connectors, such as threaded studs or bolts. The holes allow spools 30 to be joined, for example, to cross junctions 120 in missile 113. The flanges also preferably are provided with a metal seal. The union faces on spools 30, however, may be varied as desired in accordance with common practice in the art.

As described in further detail below, cross junction 120f of missile 113 will be connected via a flange union to other flowline components. A blind flange may be used to close off cross junction 120f while frac trailer 110 is being stored or transported. Cross junction 120a, which is disposed toward the end of frac trailer 110 and is the most upstream cross junction 120, also may be provided with a blind flange closing off the upstream end of missile 113 during storage and transportation. Preferably, however, cross junction 120a is provided with a port that will allow missile 113 to be flushed and cleaned out between operations.

Figure 14:
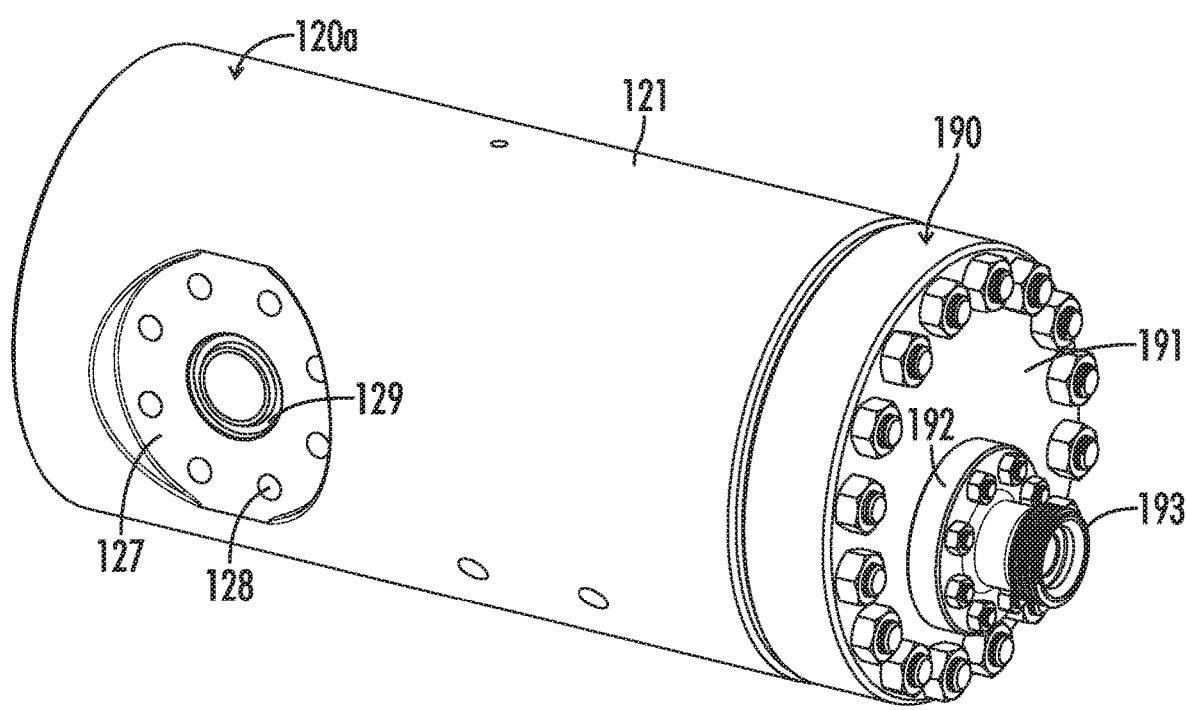
FIG. 14 is an isometric view of offset cross junction 120 shown in FIGS. 12-13 showing a flush-port assembly 190 assembled thereto.

For example, as seen best in FIG. 14, a flush-port assembly 190 is assembled to cross junction 120a. Flush-port assembly 190 generally comprises a ported flange 191 and a flanged female hammer union sub 192. Flange 191 has a port (not visible). The port extends through flange 191 to an outer union face (not visible). Thus, flange 191 is joined to cross junction 120a, and flanged female hammer union sub 192 is joined to port flange 191 by flange unions. A flush line, therefore, may be connected to female sub 193 by a hammer union to pump fluid through missile 113 to flush out fluids and particulates from prior operations. Otherwise, the port in assembly 190 may be shut off by a blind male hammer union sub joined to female sub 193. It will be appreciated, of course, that a flanged flush line may be connected directly to ported flange 191. Likewise, other types of flange union subs may be joined to ported flange 191, or that other types of union subs may be formed integrally with ported flange 191.

Thus, in contrast to conventional frac manifold 9, which has two relatively small manifolding missiles 13 which themselves are manifolded, novel frac trailer 110 comprises a single, larger, straight missile 113 which receives the discharge from all pumps 10. That is, in conventional frac systems, such as those shown in FIG. 1, pumps 10 will be lined up on both sides of frac manifold 9. Pumps 10 on one side of frac manifold 9, as represented schematically in FIG. 1, typically will feed into the missile 13 running along that side of frac manifold 9. Pumps 10 which are lined up on the other side will feed into the missile 13 running on the other side of frac manifold 9. Missiles 13 are manifolded by a section of pipe which connects their downstream ends at right angles. The combined discharge from missiles 13 then is distributed into four high-pressure flow lines 14 which run to goat head 15.

As shown schematically in FIG. 2, pumps 10 from both sides of frac manifold 110 all feed into missile 113. Each offset cross junction 120 allows two pumps 10 to feed into missile 113 from opposite sides of trailer 110. Frac trailer 110, therefore, will have a simpler, less cluttered design. It may be assembled more easily, and when in service, will allow greater access to manifold components for hook up and service. More importantly, however, novel frac manifolds incorporating a single, larger missile, such as missile 113, should provide better wear resistance and a longer service life than conventional frac manifolds incorporating multiple missiles.

That is, the slurry flowing through flow lines is highly abrasive and corrosive, moves at relatively high velocities under high pressure, and is quite turbulent in many areas. Consequently, flowline components tend to suffer material loss which can weaken the part and shorten its service life. The material loss results from a number of different dynamics, including ductile erosion and brittle erosion, both of which are exacerbated by corrosion.

Ductile erosion results from entrained sand and other particles dragging along the inner walls and cutting or ploughing into the walls. The angle of impingement typically is small, less than 30°. Ductile erosion is the primary dynamic in relatively straight sections of flow lines. Brittle erosion results from entrained sand impinging on the walls at or near normal to the surface, the impact causing tiny radial cracks in the wall. Brittle erosion is the primary dynamic in turbulent areas of the flow line, or where the flow line changes direction.

It also will be appreciated that corrosion generally tends to weaken material in the part. The part, therefore, is more susceptible to both ductile and brittle erosion. Moreover, since flowline components typically are manufactured from relatively hard steels, brittle erosion from near normal impacts caused by more turbulent flow typically plays a larger role than ductile erosion resulting from more laminar flow.

For example, turbulence and brittle erosion is the primary dynamic in the area where pump discharge lines 12 feed into missiles 13 of conventional frac manifold 9. Fluid from discharge lines 12 immediately hits the other side of missile 13, which is only a few inches away. More specifically, the inner diameter of high-pressure missiles in conventional frac manifolds typically will be sized such that they cumulatively provide the required flow rates (up to 100 bbl/minute) without excessively high fluid velocity through the missiles. The upper limit, often referred to as the erosional fluid velocity, generally is about 40 ft/sec. Thus, missiles in conventional frac manifolds typically will be made up from 3" or 4" components having, respectively, inner diameters of 2.75" and 3.5".

In contrast, novel flow lines having comparable flow rates and velocities preferably will have conduits have a diameter of at least about 5 inches or, more preferably, at least about 7 inches. For example, cross junctions 120 may have a primary bore of about 5 inches or 7 inches. Spools 30 preferably have similar dimensions. Thus, it will be appreciated that fluid entering primary bore 122 of offset cross junctions 120 from feed bores 126 will have more room to spread in missile 113. The quantity and velocity of particles impinging on the other side of primary bore 122 at near normal angles will be less than experienced by smaller diameter pipes, such as missiles 13 in conventional frac manifold 9.

In addition, by providing feed bores 127 with a long-sweep curve instead of a straight-line bore, fluid discharged from feed bores 127 will be directed at an angle more along, and less across the flow of fluid through primary bore 122. Thus, the average angle of impact for particles flowing into primary bore 122 will be diminished. To a certain extent the reduction of average impact angle on the other side of primary bore 122 will come at the expense of feed bore 122. Impact erosion will be greater in feed bore 126 than if it were a straight bore. By providing a long-sweep curve, however, the increase in impact erosion in feed bores 126 will be minimized.

Moreover, offsetting the junctions between feed bores 126 and primary bore 122 will help to minimize areas of concentrated turbulence and erosion in cross junctions 120. Turbulence created by fluid entering primary bore 122 from an upstream feed bore 126 will tend to diminish, and the flow will become more laminar as fluid travels down primary bore 122. Feed bores 126, therefore, preferably are spaced at sufficient distances to allow turbulence from one feed bore 126 to substantially subside before the discharge from the downstream feed bore 126 enters primary bore 122. For example, feed bores 126 may be offset a distance at least approximately equal to the diameter of feed bores 126, and more preferably, at a multiple thereof. Feed bores 126 as illustrated in FIGS. 12-13, for example, are offset by a factor of approximately 7 relative to their diameters. Providing a long-sweep curve in feed bores 126 also will create less initial turbulence, and therefore, laminar flow through cross junction 120 will recover more quickly.

It also will be noted that offset cross junctions 120 may be provided with significantly thicker walls than are present in traditional fittings. More specifically, cross junctions 120 and other embodiments of the novel junction fittings preferably are provided with relatively thick walls as compared to junction fittings used in conventional frac manifolds. The ratio of the minimum width of their body to the diameter of their primary bore preferably is at least about 3:2, and more preferably at least about 2:1 or 3:1. Alternately stated, the minimum thickness of the wall surrounding the primary bore is preferably at least about 25%, and more preferably at least about 50% or 100% of the diameter of the primary bore. For example, body 121 of cross junction 120 is generally cylindrical with a centrally disposed primary bore 122. Its minimum width is equal to the outer diameter of body 121. As illustrated, the outer diameter of body 121 is about 3 times as great as the diameter of primary bore 122, and the walls of primary bore 122 are approximately as thick as its diameter.

Junctions 120 also preferably are manufactured by starting with a generally cylindrical bar, machining primary bore 122, heat treating, and then machining the remaining features, such as feed bores 126, annular grooves 125 and 129, and the annular boss. It will be appreciated that at such thickness, it is difficult or impossible to bend tubular stock. Thus, despite its relatively thick walls, feed bores 126 may be provided with long sweep curves, and at the same time junction 120 can tolerate more erosion before reaching a point where the integrity of the fitting is compromised.

Frac manifolds also are usually mounted on a skid or trailer so that they may be transported easily to and from a well site. That is a significant advantage. The need to transport the manifold over roads and highways without special permits, however, limits the size of the skid or trailer and can create significant spatial constraints in the design and layout of the manifold. Frac manifolds having two or more missiles, such as frac manifold 9, require very sharp turns in the high-pressure flow lines and often more junctions. For example, each missile typically will make a right turn, or it will tee into a manifolding pipe. Such turns and junctions are particularly susceptible to erosion. They may be eliminated in the novel frac manifolds, such as frac trailer 110, which has a single, straight missile, such as missile 113, accepting discharge from pumps 10 on both sides of missile 113.

Perhaps most importantly, it has been observed that the discharge of fluid from the array of pumps creates significantly less vibration in various embodiments of the novel missiles. Conventional frac manifolds experience substantial vibration as fluid is pumped through the missiles and the rest of the system. The vibration is visibly noticeable in conventional systems, but not so in embodiments of the novel missiles. Surprisingly, vibration through the entire high-pressure side of a system, for example, in flow lines running from the manifold to the well head or zipper manifold, is reduced significantly as well. It is believed that by offsetting the flow into novel missiles, particularly with larger inner primary bores, significantly less vibration is created. Flow into conventional frac missiles typically impinges at right angles against a relatively smaller conduit.

Discharge lines 12 of pumps 10 ultimately are connected to offset cross junctions 120 of missile 113 through a flange union with a flanged component. Discharge lines 12, for example, may terminate in a flanged sub allowing them to be connected directly to cross junctions 120 at feed union faces 127. Discharge lines 12 of pumps 10 then may be connected to cross junctions 120 by flange unions. Discharge lines 12 may terminate in a hammer union sub, and cross junctions 120 provided with a flanged, mating hammer union sub. Preferably, however, pump discharge lines 12 are connected to missile 113 by connection arms 160 shown in FIGS. 3-4 and 7-9.

Connection arms 160 comprise a flanged, female sub 161 of a hammer union which is joined to cross junctions 120 at feed union face 127 by a flange union. A swivel joint 162 is connected to female sub 161 via a hammer union 163. The other end of swivel joint 162 is connected to a straight pipe section 164, also via a hammer union. Straight pipe 164 terminates in a female hammer union sub, allowing it to be connected to discharge lines 12 of pumps 10 via a hammer union. It will be appreciated, however, that other types of connections may be provided and that connection arms 160 may have various conventional designs. Likewise, cross junctions 120 may be provide with other integral features, such as a hammer union sub formed therein, to allow discharge lines to be connected in other ways.

In any event, connection arms 160 facilitate connection to pumps 10 by swinging out and away from missile 113 and frac trailer 110. The end of straight pipe 164 may be situated so that connections to pump discharge lines 12 may be made up more easily and safely. Preferably, suitable rests, such as cradle rests 165, are provided to support the end of pipe 164 and relieve stress on swivel joint 162 when trailer 110 is not in use. Cradle rests 165 also preferably include retainers to secure the end of pipe 164 when trailer 110 is being moved.

It will be appreciated that connection arms 160 are heavy. When extended, they can create significant stress on their connections to cross junctions 120, especially hammer union 163. Thus, frac trailer 110 may be provided with conventional supports which provide vertical support for connection arms 160 near where they are joined to missile 113. Such conventional supports can relieve stress on connections such as hammer unions 163, but must be precisely sized and assembled to properly align with the connection. If too short, they may not sufficiently relieve stress caused by the weight of connection arms 160. If too tall, they may create stress in hammer unions 163.

Thus, and in accordance with other aspects of the invention, connection arms 160 are supported by adjustable supports, such as adjustable supports 170 seen best in FIGS. 5-9. Supports 170 comprise a rest, such as split collar 171. Split collar 171 has a pair of mating, semi-cylindrical or u-shaped halves 171a and 171b that fit around the end of swivel joint 162 of connection arms 160 near hammer union 163. Each collar half 171a and 171b has ears allowing them to be connected by nuts and bolts or other fasteners. The end of swivel joint 162, therefore, may be secured within collar 171. If desired, elastomer gaskets may be provided between swivel joint 162 and collar 171.

Collar 171 is supported by a stand 172 mounted on a base 173. Base 173 is mounted on trailer 110, preferably releasably so. For example, base 173 generally is a plate-like component, one end of which is formed into a curve allowing it to rest on one of the suction lines 182. The other end of base 173 has a slot allowing it to be releasably connected to one of the lateral beams 131, for example, by a nut and bolt. Stand 172 comprises a plurality of mating buttresses 174 and a generally cylindrical, vertical passage 175 in the upper portion thereof. (Passage 175 is hidden in the figures, but its general location is identified in FIGS. 5-6.) A threaded adjuster 176 is fixedly connected at one end to collar 171. The other end of threaded adjuster 176 extends into vertical passage 175 in stand 172. Adjusting nuts 177 are provided on threaded adjuster 176.

Threaded adjuster 176, therefore, may be moved up or down by rotating nut 177 in one direction or the other. Thus, stress on hammer union 163 joining connection arm 160 to cross junction 120 may be more effectively minimized by the novel supports 170. Supports 170 may be adjusted vertically to allow collar 171 to be more accurately positioned relative to hammer union 163.

Missile 113 preferably is mounted along the center of frac trailer 110 on suitable mounts, for example, missile mounts 140. Missile mounts 140 in turn are mounted on trailer chassis 130. More specifically, each offset cross junction 120 of missile 113 is supported by a missile mount 140. Missile mount 140 in turn generally comprises a cradle 141 and a pedestal 142.

Cradles 141 may be viewed as lateral segments of an open cylinder, and thus provide a curved surface upon which offset cross junctions 120 may rest. Preferably, junctions 120 fit relatively closely therein and are releasably secured to cradles 141. For example, threaded studs may be anchored in junction 120 and extend through suitable openings in cradle 141, allowing junction 120 to be secured within cradle 141 by threaded nuts. Other threaded connectors, and other connectors, however, may be used.

Preferably, as seen best in FIGS. 3A, 4A, and 7-8, cradle 141 will be dimensioned such that it extends over a substantial portion of the bottom half of junction 120. In particular, the inner, transverse arc of cradle 141 preferably approaches 180°, and its length approaches that of junction 120 to enhance the lateral stability of junction 120 within cradle 141. Preferably, the arc of cradle 141 is at least about 150° and its length is at least about 50%, more preferably at least about 80% of the length of junction 120. Preferably, as shown, the length of cradle 160 is such that it extends laterally beyond both feed union faces 127 of junction 120. Thus, it will be appreciated that the connection between junction 120 and cradle 141 is quite secure and rigid.

Pedestals 142 comprise a pair of standards 143 and a base 144. Standards 143 extend vertically upward at each end of base 144 to the bottom of cradle 141, supporting cradle 141 above chassis 130. Base 144 comprises a symmetrical pair of spaced, horizontal plates. Each plate of base 144 has a relatively short, vertical plate 145 running laterally along its inner edge. Standards 143 straddle the plates of base 144 and have a cutout. The cutout corresponds generally to vertical plates 145 and the gap between the base plates, thus creating a channel 146 running laterally through the lower part of mount 140. It also will be noted that pedestals 142 extend over both I-beams 131 of chassis 130. In particular, both the bottoms of standard 143 and base 144 extend at least partially over both I-beams 131. The tops of standards 143 also extend substantially around the bottom of cradle 141.

Standards 143, therefore, allow missile 113 to be tied structurally not only to support members spanning I-beams 131, such as base 144, but also directly to I-beams 131. That is, force generated by and within cross junctions 120 will be transmitted across the width of base 144. Such forces also will be transmitted to points directly above I-beams 131. Mounts 140, therefore, will be extremely resistant to both vertical and transverse vibrational forces.

Mounts 140 may be more or less permanently incorporated into chassis 130, for example, by welds. Preferably, however, mounts 140 are releasably secured to chassis 130. For example, pedestals 142 are mounted to lateral I-beams 131 by bolts that extend through openings in pedestal base 144 and I-beam 131. The openings in base 144 preferably are obround or otherwise somewhat laterally elongated to allow for some imprecision in mounting pedestals 142.

As noted, conventional frac manifolds experience considerable vibration during operation which is largely absent in embodiments of the novel manifolds. While offsetting the flow into, for example, missile 113 and providing it with a relatively large primary bore is believed to minimize the creation of vibrational forces, it also is believed that the assembly, location, and mounting of missile 113 on frac trailer 110 aids in minimizing vibration. For example, the components of missile 113 are joined by flange unions, creating a relatively rigid flow line. Hammer and clamp unions allow significantly more bending at the union, especially as the diameter of the components diminishes.

Missile 113 in frac trailer 110 also is centered between two interconnected lateral frame members, namely I-beams 131 in chassis 130. Conventional frac manifolds may have a pair of lateral frame members, but they typically have a pair of missiles, each one mounted close to or even outside of the lateral frame members. Although somewhat elevated above I-beams 131, missile 113 also is firmly connected to both I-beams 131 by mounts 140. Mounts 140 provide extensive rigid connecting structure between missile 113 and I-beams 131. I-beams 131 in turn provide a relatively large, stable footprint for frac trailer 110. Surprisingly, vibration through the entire high-pressure side of the system, for example, in the flow line running from the manifold to the well head or zipper manifold, is significantly reduced as well.

Flowline components are quite heavy and difficult to manipulate. Thus, the novel frac manifolds preferably incorporate systems to assist in making up, and breaking down the components. For example, assembler 150 may be operated to help make up and break down cross junctions 120 and spools 30 in missile 113. As seen best in FIGS. 3 and 3A, assembler 150 comprises a shifter 151, and a linear actuator 152.

Shifter 151 is an elongated shaft or rod-like member. It has a generally open, rectangular cross-section, but other configurations may be provided. Shifter 151 extends laterally, more or less the length of missile 113 along the center line of chassis 130. It is mounted on top of frame cross members 132 and through channels 146 in mounts 140. One end of shifter 151 extends to a position under cross junction 120a toward the rear of trailer 110. The other end of shifter 151 extends under cross junction 120e near the front of trailer 110, where it is connected to linear actuator 152.

Linear actuator 152 is a hydraulic cylinder, but other linear actuators such as pneumatic cylinders or electromagnetic actuators may be used. In any event, hydraulic cylinder 152 will drive shifter 151 laterally back and forth. Bearing elements, such as hard elastomer pads 158, may be placed on frame cross members 132 to facilitate movement of shifter 151.

Shifter 151 may be selectively and releasably coupled to any of cross junctions 120a to 120e. For example, shifter 151 is provided with pairs of transversely opposed openings (not visible in figures) spaced along its length. When missile 113 is made up, the shifter openings align with transversely opposed openings 147 provided through vertical plates 145 in base 144 of mounts 140. Shifter 151 may be releasably coupled to a particular cross junction 120 by inserting a pin 156 through openings 147 in its corresponding mount 140 and the openings in shifter 151. Openings 147 in mounts 140 may be obround or otherwise elongated to allow for some imprecision in aligning them with the openings in shifter 151. Other mechanisms for releasably connecting shifter 151 and mounts 140, however, are known and may be used if desired.

By selectively coupling and actuating shifter 151, the unions between cross junctions 120 and spools 30 may be more easily made up and broken down. For example, should the need arise, assembler 150 may be used to disassemble and replace a particular cross junction 120 from missile 113, such as junction 120c. Pin 156 may be placed through openings 147 in mount 140 holding junction 120c and the corresponding opening in shifter 151. Shifter 151 will thus be coupled to junction 120c through its mount 140. The bolts securing mounts 140 for cross junctions 120a, 120b, and 120c then will be removed, as will the nuts securing the union between cross junction 120c and spool 30c. Mounts 140 for junctions 120d, 120e, and 120f will remain securely fastened to chassis 130.

Hydraulic cylinder 152 then may be actuated to move shifter 151 toward the rear of trailer 110. Uncoupled mounts 140 will be able to slide across frame I-beams 131. Thus, the entire subassembly of junction 120c, spool 30b, junction 120b, spool 30a, and junction 120a, along with the corresponding mounts 140, will be shifted rearward by shifter 151, creating a gap between junction 120c and spool 30c. Bearing elements, such as hard elastomer pads 148, may be provided under base 144 of mounts 140 to facilitate shifting of mounts 140.

The nuts securing the union between cross junction 120c and spool 30b then may be removed. Cross junction 120c will remain uncoupled from chassis 130 and coupled to shifter 151. Hydraulic cylinder 152 then may be actuated to move shifter 151 partially back toward the front of trailer 110, to a point where junction 120c is clear of both spool 30b and 30c. Cross junction 120c then may be removed, typically with the aid of a mechanical lift. A replacement junction 120c may be assembled into missile 113 by reversing the process described above.

Assembler 150 also may be used to make up or break down a connection between missile 113 and flow line 114. Mounts 140 for all cross junctions 120 will be uncoupled from chassis 130. Shifter 151 may be coupled to any of mounts 140. When actuated, hydraulic cylinder will drive the entire missile 113 back and forth across chassis 130.

It will be appreciated that assembler 150 may be modified in various ways to accommodate different missile mounts. Similarly, instead of providing a selective, releasable connection between a shifter and missile mounts, the shifter and mounts may be fixedly connected, and selective, releasable connections provided between the mounts and the missile. In such embodiments, the missile components would shift within and along the stationary mounts. If a missile is mounted directly to a frame, a selective, releasable connection may be provided between a shifter and the missile components. Other modifications will be apparent to workers in the art.

The novel assemblers will allow the novel missiles to be made up and broken down more easily and safely. Their application, however, is not limited to the novel missiles or even to missiles in general. Various other flow lines and flowline subassemblies, such as zipper manifolds, are commonly mounted on skids or other chassis. Components of flow line 114, as another example, may be mounted on a skid provided with an assembler. The novel assemblers may be used to assist in making up and breaking down the components of such units.

Trailer 110 may, and typically will incorporate other features commonly provided in conventional frac trailers, and the trailers themselves may be of many different conventional designs. Chassis 130 can have other configurations, and may incorporate any number of conventional suspension systems and wheel assemblies. Missile 113 and suction lines 182 will be substantially horizontal when I-beams 131 are resting on a site pad, but hydraulic or other leveling mechanisms may be provided if desired. Hydraulic jacks 111, for example, may be used to level chassis 130. Running and signal lights may be provided as desired or required by regulation. The hydraulic systems, such as hydraulic cylinder 152 in assembler 150 and jacks 111 may be actuated and controlled by conventional systems. Such systems typically will include hydraulic pumps, accumulators, lines, and valves, and digital controllers and operation panels. Given that such features are well known to workers in the art, they have largely been omitted from the figures for the sake of clarity.

Preferably, however, trailer 110 is provided with a gasoline powered internal combustion engine, such as motor 133. Motor 133 may be used as a source of mechanical power allowing trailer 110 to be fully operational on site without the need for electrical hookups or other external power sources. Toward that end, motor 133 will be used to drive a conventional electric generator. The generator, in turn, will be used to power hydraulic systems on trailer 110, for example, the hydraulic pumps and valves associated with hydraulic cylinder 152 in assembler 150. The electric generator also may be used to power the control systems for hydraulic systems or other electromechanical systems on the novel trailers.

As discussed above, frac manifold 110 is a trailer mounted manifold where missile 113, suction lines 182, and the other manifold components are mounted on rolling chassis 130. If desired, however, the novel frac manifolds may be carried on the chassis of a truck, or they may be carried on a non-rolling chassis. In accordance with other broad embodiments of the invention, the novel missiles and other manifold components also may be mounted on a rolling or non-rolling chassis to provide modular manifolds. Modular manifolds can provide greater flexibility in meeting the requirements of particular fracturing operations, which may call for greater or lesser numbers of pumps.

Figures 15, 16:
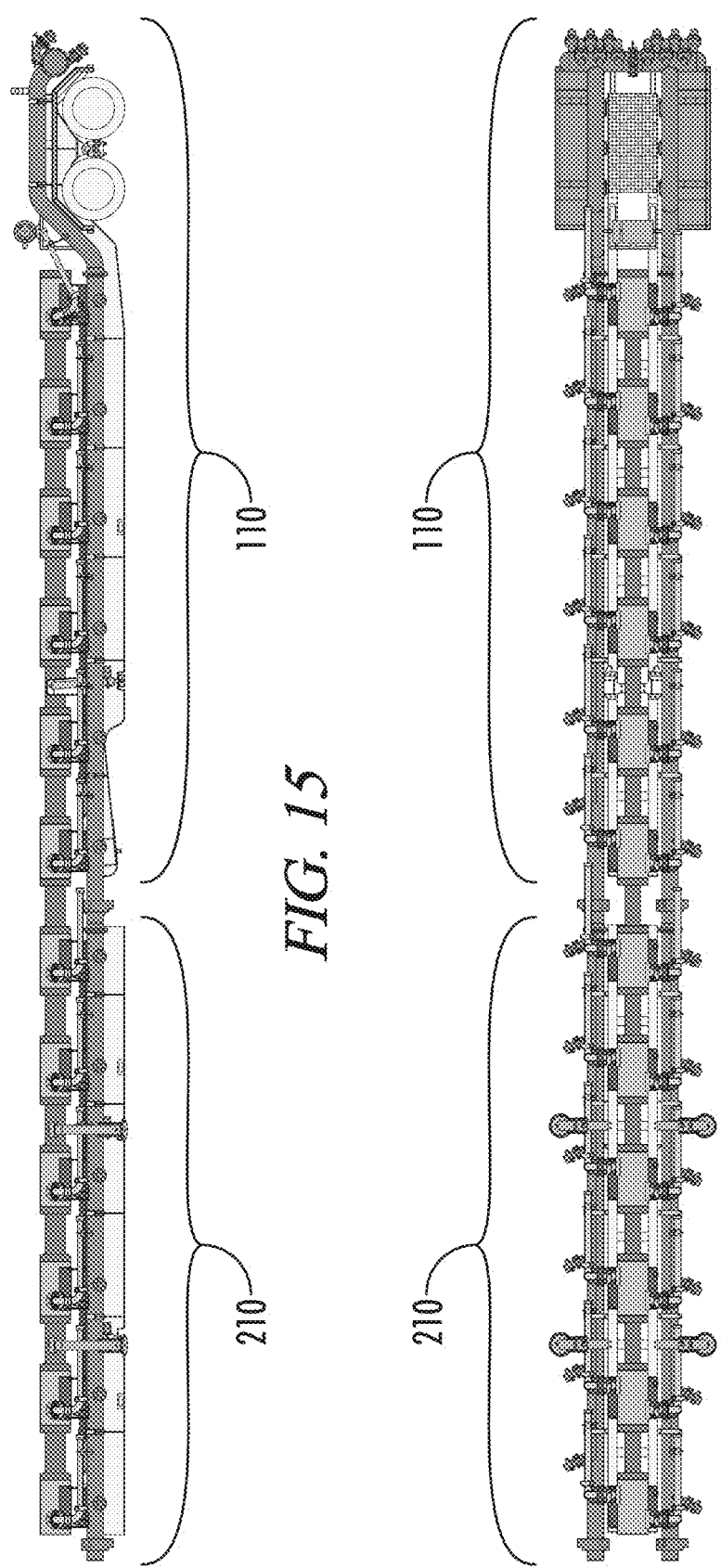
FIG. 15 is a side elevation view of frac trailer 110 connected to a first preferred embodiment 210 of the novel modular frac manifolds having four jackup legs 211.
FIG. 16 is a top view of frac trailer 110 connected to modular frac manifold 210.

For example, as shown in FIGS. 15-16, frac trailer 110 is assembled to a frac manifold module 210. Modular manifold 210 in most respects is identical to frac trailer 110. It comprises missile 113, missile mounts 140, assembler 150, connection arms 160, and adjustable supports 170. The hydraulic system (not shown) actuating hydraulic cylinder 152 of assembler 150 on modular manifold 210 may be driven by electrical power generated by frac trailer 110. Alternately, it may be connected to another external source of electrical power, or modular manifold 210 may be provided with its own motor 133 and electrical generator.

In contrast to frac trailer 110, frac module 210 has a non-rolling chassis 230. Non-rolling chassis 230, however, is similar in many respects to rolling chassis 130. Chassis 230 comprises a pair of lateral beams, such as I-beams 231, which are connected by cross members 232. The primary difference between rolling chassis 130 and non-rolling chassis 230 is that the latter does not incorporate a suspension and wheel assembly. On the other hand, if desired, modular manifold 210 may be trailer-mounted or have other conventional chassis.

Manifold 210, as noted, is designed to enable a modular approach to designing and installing frac manifolds for frac systems. Thus, the design and dimensions of rolling chassis 130 and non-rolling chassis will be coordinated to allow missiles 113 and suction lines 182 on frac trailer 110 and modular manifold 210 to be connected in series, that is, end-to-end.

More particularly, modular manifold 210 does not incorporate a suction manifold 181. Instead, suction lines 182 may be connected at their upstream end to the downstream end of suction lines 182 of trailer 110. The connection preferably is made up with flanged spools having the same inner diameter as suction lines 182. Other conventional flowline components, however, may be used. In any event, when connected, suction lines 182 on frac trailer 110 and modular manifold 210 provide a single pair of joined suction lines 182, one on each side of the combined manifold 110/210. Preferably, frac trailer 110 and modular manifold 210 will be positioned such that suction lines 182 align axially, allowing the joined suction lines 182 to extend in a straight line.

The upstream end of missile 113 in frac module 210 is not shut off. Upstream cross junction 120a of modular module 210 lacks a blind flange or other closure assembly, such as flush-port assembly 190 incorporated into missile 113 of frac trailer 110. Instead, upstream cross junction 120a of modular manifold 210 may be connected to downstream cross junction 120f of frac trailer 110. The connection preferably is made up with flanged spools, such as spools 30, but other conventional flow line components may be used. Preferably, frac trailer 110 and modular manifold 210 will be positioned such that missiles 113 align axially and joined missiles 113 extend in a straight line. Cross junction 120f of missile 113 on modular manifold 210 then may be connected to flow line 114 running to junction head 115 of zipper manifold 16 as described further below.

In any event, once their respective missiles 113 and suction lines 182 are connected, combined manifold 110/210 will be able to service a total of 24 pumps 10, 12 on each side. Flow through joined suction lines 182, but more importantly, flow through joined missiles 113 will proceed in a straight line. The alignment of joined missiles 113 will tend to maintain a more laminar flow despite the turbulence introduced by fluid flowing from discharge lines 12 of pumps 10. Equally as important, a single, or in any event, fewer flow lines and fewer junctions would be required as compared using two separate conventional frac manifolds.

It also will be appreciated that the novel manifold modules may have greater or fewer cross junctions allowing them to connect to more or fewer pumps. Likewise, the modules may be used in many different combinations to accommodate however many pumps as may be required.

The novel modules also may incorporate a variety of missiles, including multiple missiles, and suction lines. The general design of conventional missiles and suction lines in known, and they may be modified to allow the missiles and suction lines to be connected in series as illustrated above in respect to combined manifold 110/210.

The novel modular manifolds, as noted, may be mounted on rolling chassis. When they have a non-rolling chassis, such as chassis 230 of modular manifold 210, they will be transported to a site on a lowboy, flatbed, or other trailer. They may be loaded on and off the trailer by conventional lifting equipment. Preferably, however, they will incorporate jackup legs allowing them to essentially self-load and self-unload.

Figure 17:
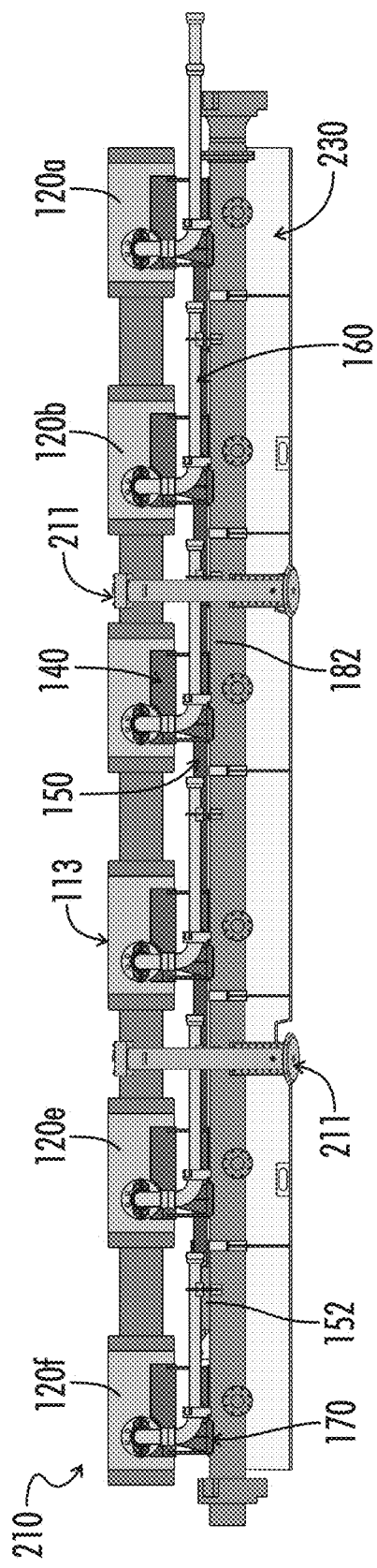
FIG. 17 is a side elevation view of modular frac manifold 210 shown in FIGS. 15-16.
Figure 18:
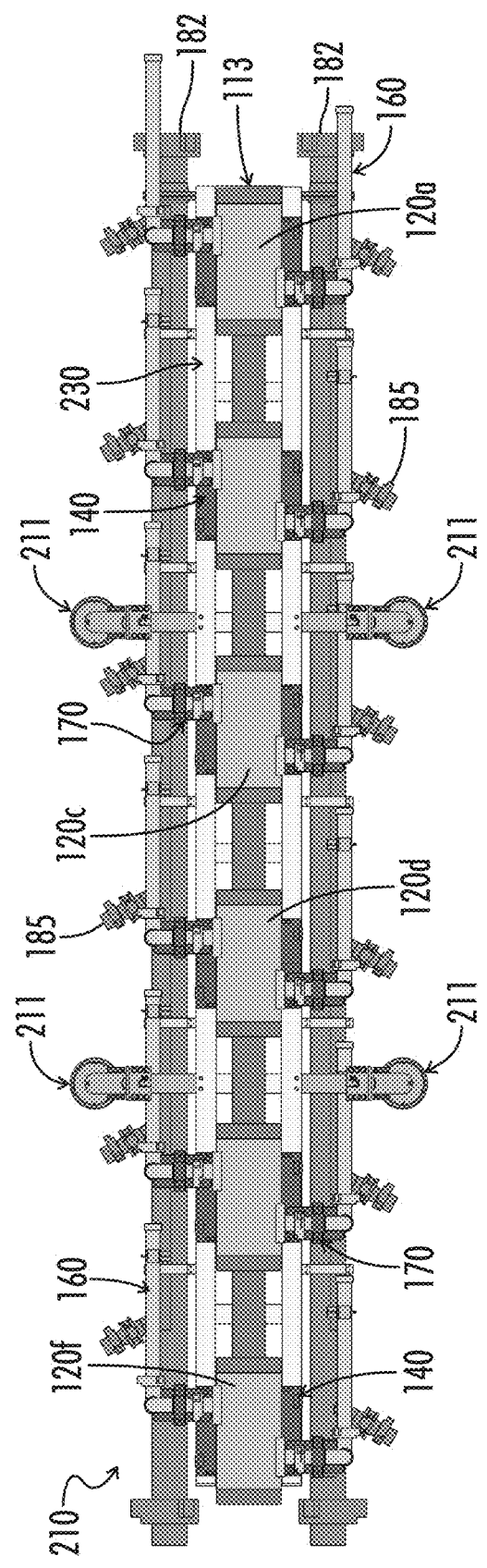
FIG. 18 is a top view of modular frac manifold 210.

For example, as may be seen in FIGS. 17-18, modular manifold 210 is provided with four hydraulic jackup legs 211. A pair of jackup legs 211 is situated toward the front end of manifold 211, one on each side. The other pair of jackup legs 211 is situated toward the back end of manifold 211. Jackup legs 211 are mounted to chassis 230 and may be operated to elevate and lower chassis 230.

Figure 19:
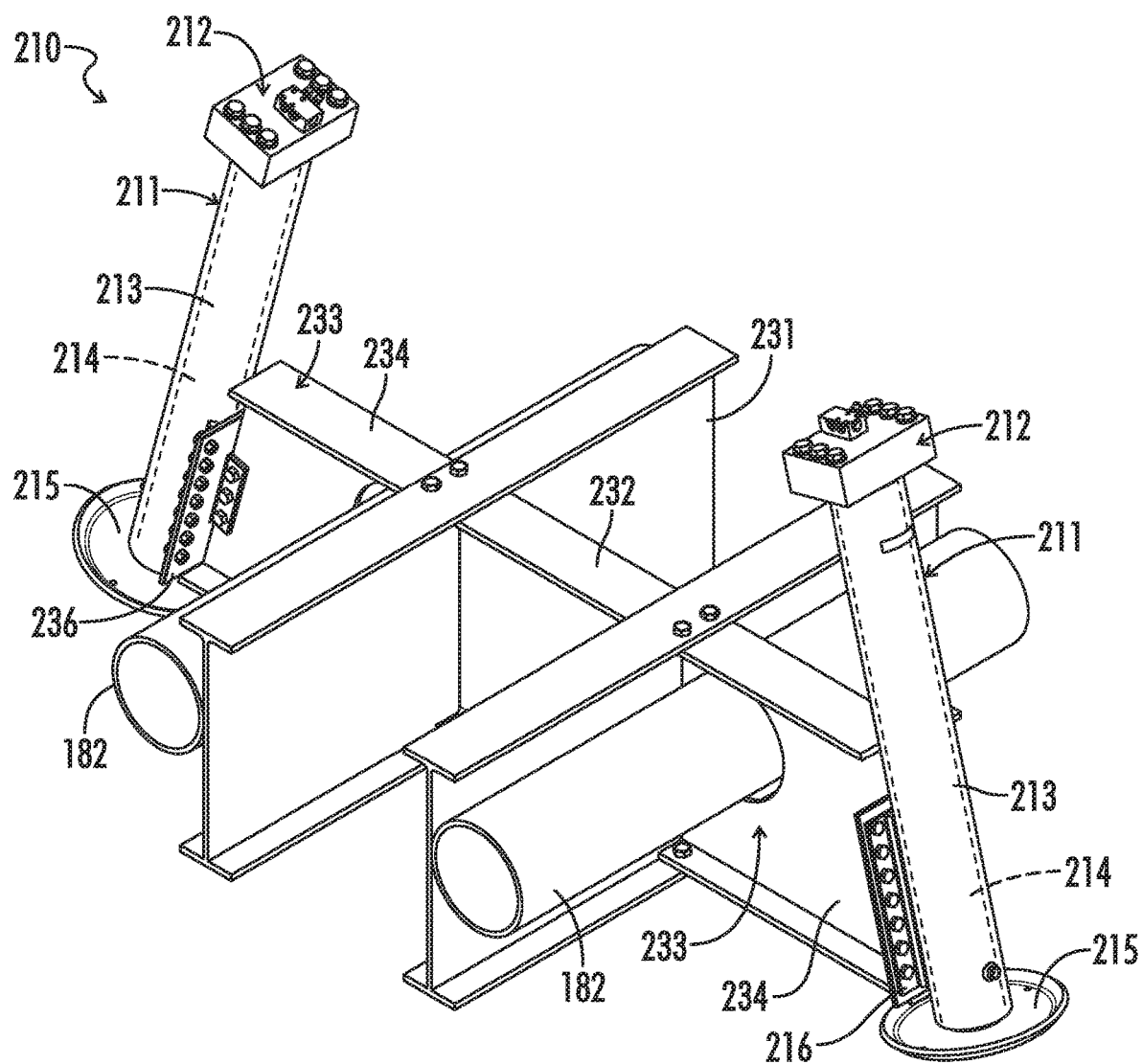
FIG. 19 is an isometric view of a portion of modular frac manifold 210, various components thereof having been removed to show jackup legs 211 in greater detail.

Jackup legs 211 are shown in greater detail in FIG. 19. Missile 113, mounts 140, and many other components of modular manifold 210 have been removed from that figure to better show jackup legs 211. As may be seen therein, each jackup leg 211 comprises a vertical lifter 212 connected to a mount 233. Vertical lifter 212 is of conventional design. It is in essence a hydraulic cylinder and has an outer tube 213 from which an internal piston or tube 214 may be extended and retracted by conventional hydraulic flow. Internal tube 214 preferably is provided with a shoe or foot at its lower end, such as pivoting shoe 215. Vertical lifters 212 are connected by lines to conventional hydraulic systems, and those systems are controlled by conventional controls (not shown).

Mounts 233 are provided on chassis 230. Mounts 233 include an I-beam 234 which extends away from I-beams 231. A plate 236 is provided at the other end of I-beams 234. Outer tube 213 of vertical lifter 212 is connected via a plate 216 to plate 236 of mounts 233. Mounts 233 may be connected to I-beams 231, and vertical lifters 212 may be connected to mounts 233 by any suitable means, such as welding. Preferably, they are removeably connected, for example, by bolts or other threaded connectors. The length of mounts 233 and the length and stroke of inner tube 214 are coordinated such that jackup legs 211 may be actuated to allow manifold module 210 to be loaded and unloaded from a trailer.

That is, mounts 233 extend vertical lifters 212 beyond the edges of the trailer, as may be best appreciated by viewing FIG. 18. When vertical lifters 212 are actuated, inner tubes 214 will extend down toward the ground a sufficient distance to raise modular manifold 210 above the bed of the trailer. The trailer then may be moved away from under manifold 210. Vertical lifters 212 then will be actuated to lower manifold 210, allowing it to rest on the site pad. That procedure may be reversed to load modular manifold 210 on the trailer once operations are completed. It will be appreciated as well that jackup legs 211 may be disassembled from modular manifold 210 for transportation to or from a site, and then installed when needed.

Figure 20A:
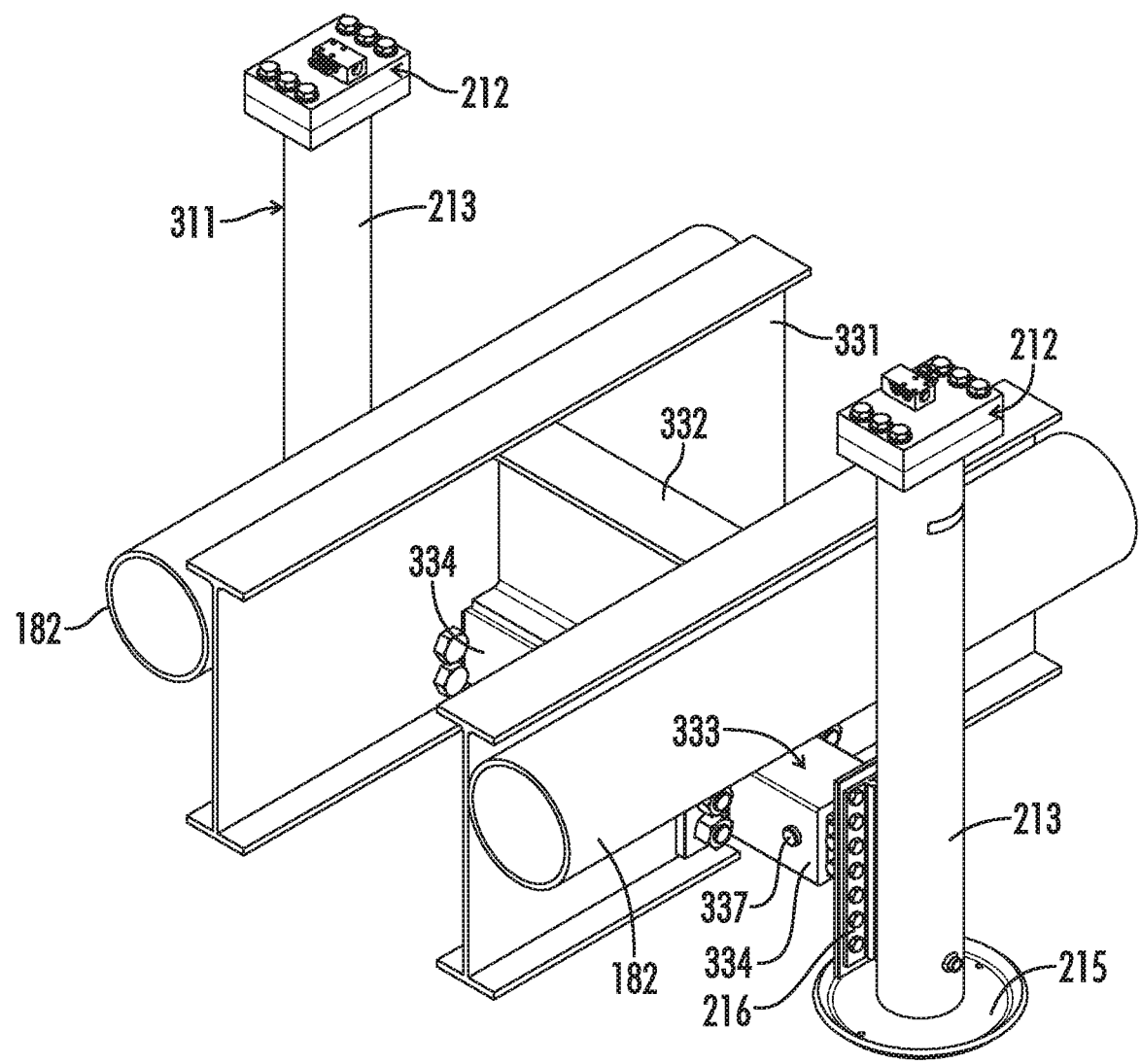
FIG. 20A and FIG. 20B are isometric views of other preferred jackup legs 311 which may be extended horizontally away from, for example, modular frac manifold 210.
Figure 20B:
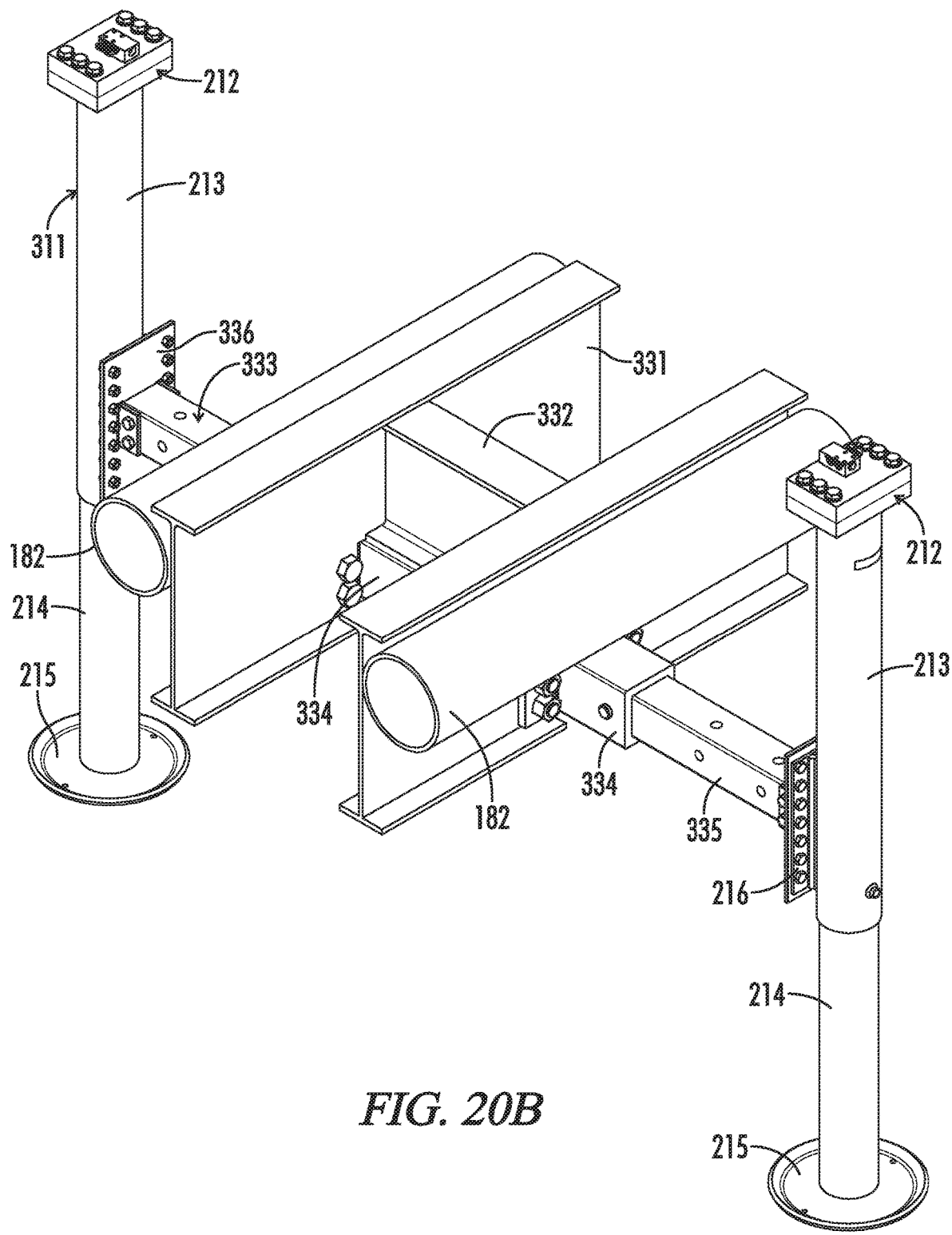

Jackup legs also may be provided on mounts that allow them to be extended horizontally. For example, modular manifold 210 may be provided with four horizontally extendable jackup legs 311. Jackup legs 311 are shown in FIG. 20. FIG. 20A shows jackup legs 311 in a fully retracted position, and FIG. 20B shows them in a fully extended position. As shown therein, jackup legs 311 comprise vertical lifters 211 connected to mounts 333. Mounts 333 comprise a tube 334 and a horizontal extender 335. Tube 334 has a generally square cross-section and extends transversely across chassis 330. It comprises three tube segments which are mounted to I-beams 331. The tube segments are mounted in alignment with each other and with cut-outs (not shown) in I-beams 331. Horizontal extenders 335 are slidably carried within each end of tube 334. They have a plate 336 provided at their outer end. Outer tube 213 of vertical lifter 212 is connected via plate 216 to plate 336 of extenders 335. The segments of tube 334 may be connected to I-beams 331, and vertical lifters 212 may be connected to horizontal extenders 335 by any suitable means, such as welding. Preferably, they are removeably connected, for example, by bolts or other threaded connectors.

In any event, horizontal extenders 335 may be pulled out of tube 334 to extend vertical lifters 212 beyond the edges of a transport trailer. Preferably, mounts 333 will be provided with a mechanism for releasably securing extenders 335 within tube 334 in their retracted and in one or more extended positions. For example, extenders 335 and tube 334 may be provided with sets of holes which may be aligned by positioning extenders 335, thus allowing extender 335 to be releasably secured to tube 334 by pins 337. The length and stroke of horizontal extenders 335 and of inner tube 214 are coordinated such that vertical lifters 212 may be actuated to allow manifold module 210 to be loaded and unloaded from a trailer.

It will be appreciated that suitable jackup legs may have other designs that allow the modular manifold to be self-loading and self-unloading. A variety of hydraulic lifters are available from Power-Packer, Inc, Westfield, Wis., and other manufacturers. If desired, horizontal extenders also may be hydraulically driven, and many conventional hydraulic mechanisms may be adapted for use in the novel modular manifolds.

Figure 21:
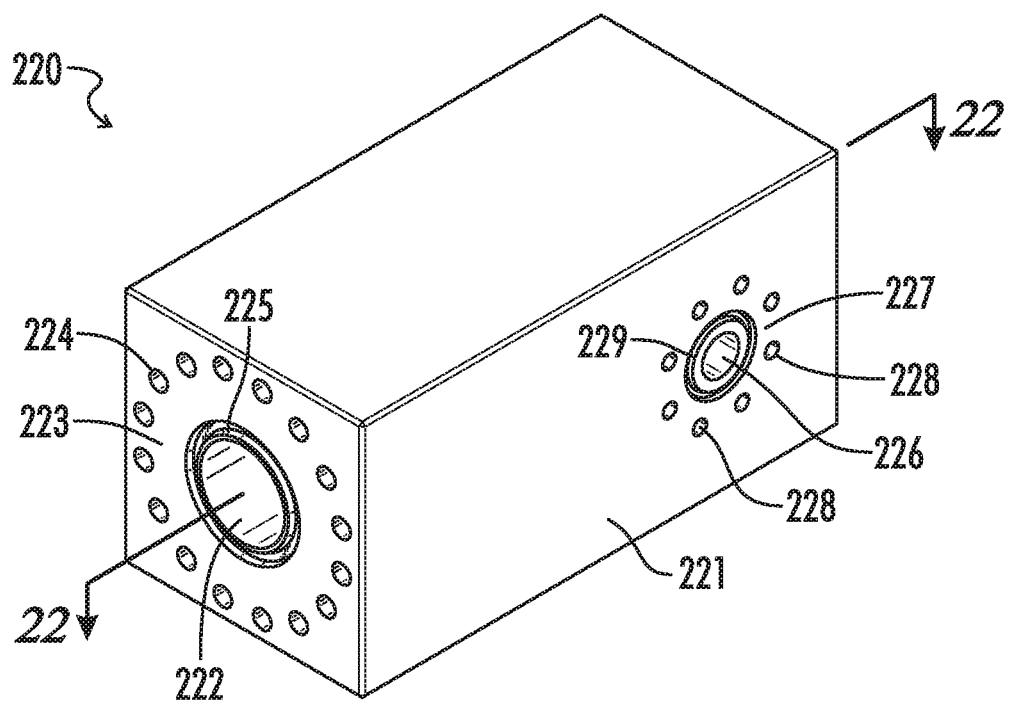
FIG. 21 is an isometric view of a second preferred embodiment of the flowline components of the subject invention, namely, an offset cross junction 220 having straight-line feed bores which may be used, for example, in missile 113 of frac trailer 110.
Figure 22:
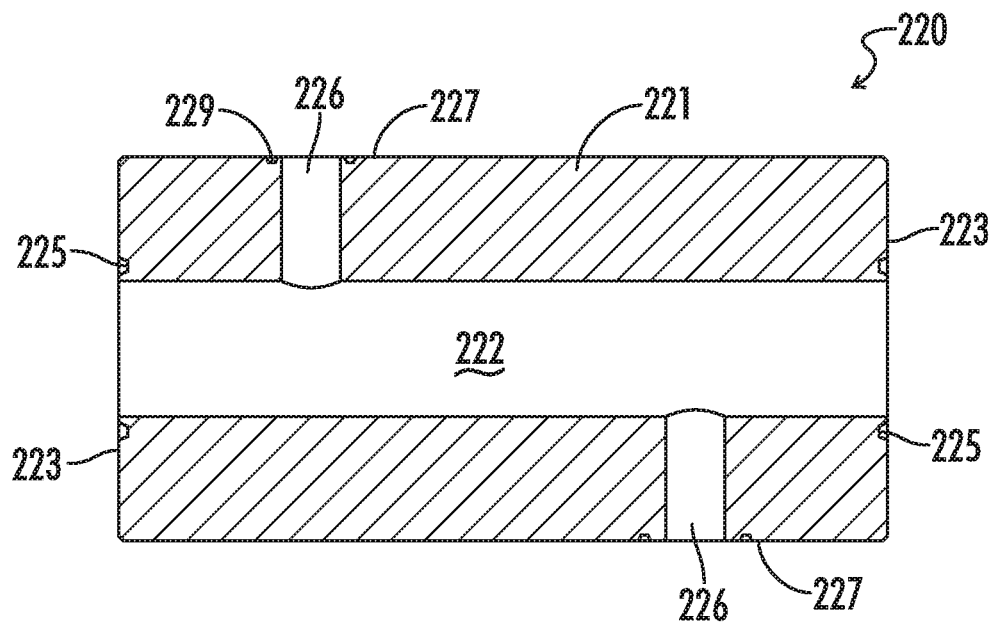
FIG. 22 is a cross-sectional view of offset cross junction 220 shown in FIG. 21.

While offset cross junctions 120 of missile 113 provide many advantages, it will be appreciated that other junctions accepting feed from two or more pumps may be incorporated into the novel missiles and frac manifolds. For example, offset cross junction 220 shown in FIGS. 21-22 may be connected to two pumps 10. As seen therein, offset cross junctions 220 has a somewhat elongated, solid rectangular body 221 having a primary bore 222. Bore 222 provides the primary conduit through which slurry passes as it is conveyed towards well head 17. Bore 222 extends between opposing flat surfaces or union faces 223 on body 221.

Offset cross junctions 220 also are provided with a pair of bores 226 which provide conduits for feeding discharge from an individual pump 10 into primary bore 222. Feed bores 226 extend perpendicularly from flat union faces 227 on body 221 and lead into primary bore 222. Primary union faces 223 and feed union faces 227 are substantially identical to union faces 123 and 127 in offset cross junction 120. They also may be provided with weep ports (not shown) if desired.

Like cross junction 120, when cross junctions 220 are incorporated into missile 113 they will have a larger diameter than multiple, smaller flowlines collectively providing comparable flow rates and velocities. The quantity and velocity of particles impinging on the other side of primary bore 222 at near normal angles will be less than experienced by smaller diameter pipes. Feed bores 226 in cross junctions 220 also are offset axially, as in cross junction 120. Offsetting feed bores 226 will help to minimize areas of concentrated turbulence and erosion in cross junctions 220. Unlike cross junctions 120, however, feed bores 226 in cross junctions do not have a long-sweep curve. They are straight-line bores. Thus, the average angle of impact for particles flowing into primary bore 222 will be greater, and will tend to cause more erosion than in cross junction 120.

Offset cross junction 220, however, is a block fitting. That is body 221 of junction 200 has a generally polyhedral configuration or, more specifically an elongated, solid rectangular configuration. As compared to the tubular fittings from which missiles in conventional frac manifolds traditionally are assembled, polyhedral bodies, such as solid rectangular and other prismatic bodies, can easily be manufactured to provide cross junctions 220 with additional thickness in conduit walls.

Preferably the minimum width of body 221 is at least about 3:2, and more preferably at least about 2:1 or 3:1. Body 221 of cross junction 220 has a generally square cross section, so its minimum width is the distance between opposing sides of body 221. As illustrated, the minimum width of body 221 is about 3 times as great as the diameter of primary bore 222. Thus, like cross junctions 120, junctions 220 should be able to tolerate more erosion before reaching a point where the integrity of the fitting is compromised.

Figure 23:
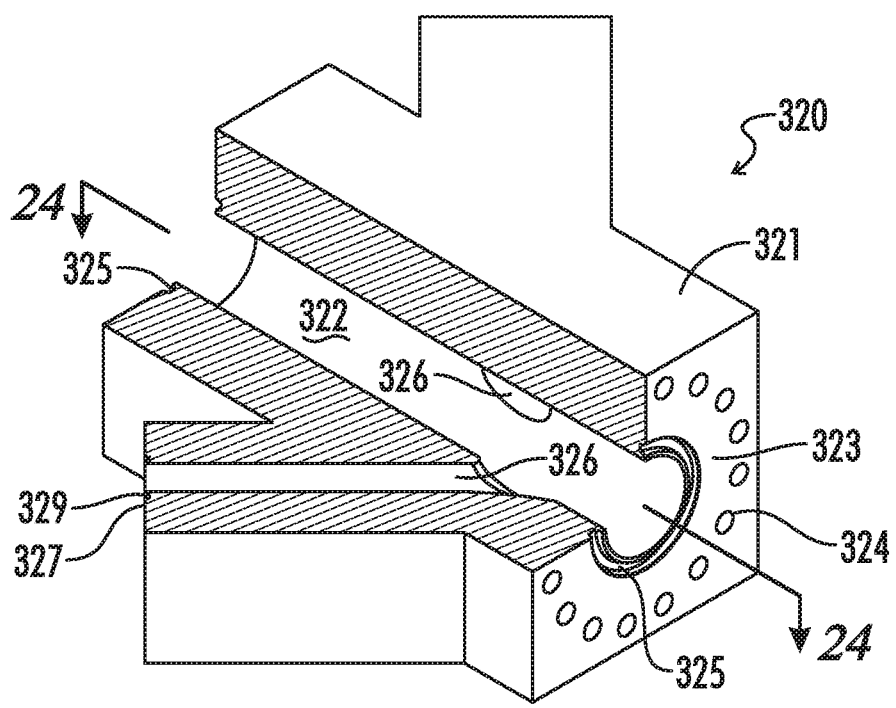
FIG. 23 is an isometric view, with an axial quarter-section removed, of a third preferred embodiment of the flowline components of the subject invention, namely, an offset lateral cross junction 320 having long-sweep feed bores which may be used, for example, in missile 113 of frac trailer 110.
Figure 24:
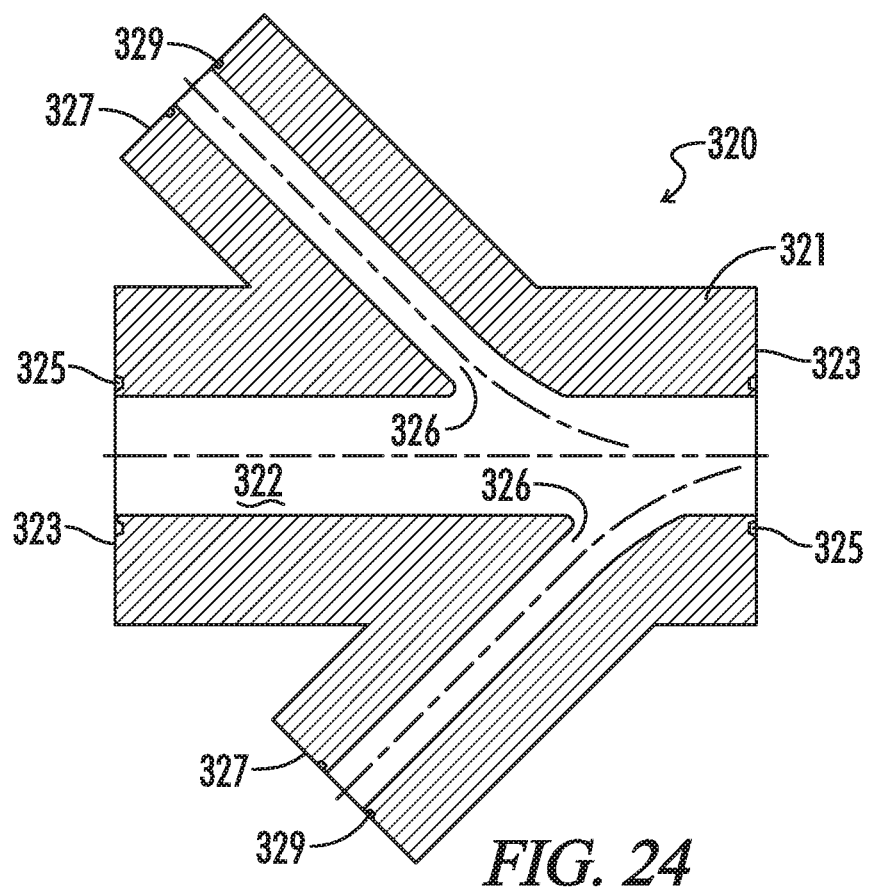
FIG. 24 is a cross-sectional view of offset lateral cross junction 320 shown in FIG. 23.

Offset lateral cross junction 320 is shown in FIGS. 23-24. Junction 320 may be referred to as an offset "lateral" cross junction in that their feed bores intersect with the primary bore a shallower angle, as compared to a tee fitting which intersects more or less normal to the primary bore. Junctions 320 also may be incorporated into missile 113 and connected to two pumps 10. As may be seen in FIGS. 23-24, offset lateral cross junction 320 has a body 321. The main portion of body 321 is polyhedral and, more specifically, has a generally cuboid shape with trapezoidal prism shaped arms extending from opposite faces. Body 321 has a primary bore 322. Bore 322 provides the primary conduit through which slurry passes as it is conveyed towards well head 17. Bore 322 extends between opposing flat surfaces or union faces 323 on body 321.

Offset lateral cross junctions 320 also are provided with a pair of bores 326 which is provide conduits for feeding discharge from an individual pump 10 into primary bore 322. Bores 326 extend perpendicularly from flat union faces 327 on body 321 and lead into primary bore 322. Primary union faces 323 and feed union faces 327 are substantially identical to union faces 123 and 127 in offset cross junction 120. They also may be provided with weep ports (not shown) if desired.

It will be noted that bores 326 of offset lateral cross junction 320 generally extend toward primary bore 322 at an interior angle, for example, 45° as shown in FIG. 24. The major portion of bores 326 extends along that angle, and feed bores 326 may be deemed to intersect with primary bore 322 at that angle. As they approach primary bore 322, however, bores 326 are provided with a long-sweep curve having a sweep radius of approximately 7. Bores 326 also intersect with primary bore 322 at axially offset junctions. Thus, it is expected that lateral cross junction 320 will provide further improvements in wear resistance and service life. Fluid entering primary bore 322 of lateral cross junctions 320 from feed bores 326 will not only have more room to spread, but will enter primary bore 322 at a shallower angle. Discharge will be further encouraged to flow more along and less across flow in primary conduit 322 by the long-sweep curves. Particles impinging on the other side of primary bore 322 on average will impact at much shallower angles, further reducing the effects of brittle erosion. Flow through primary bore 322 also will return to laminar flow more quickly.

Consistent therewith, the intersection angle between feed bores 326 and primary bore 322 may be varied. Preferably, it will be substantially less than 90°. Little benefit will be realized at angles near 90°. More preferably, the intersection angle will be from about 15° to about 60°. Likewise, the sweep ratio of the curve may be varied. Given that feed bores 326 already approach primary bore 322 at an angle, the sweep ratio will tend to be somewhat higher than, for example, in feed bores 126 of cross junctions 120, which approach at right angles to primary bore 122. It also will be appreciated, as compared to the offset between feed bores 126 in offset cross junction 120, feed bores 326 in lateral cross junction 320 may be offset to a lesser degree. Since fluid is entering primary bore 322 at a shallower angle, turbulence in primary bore 322 will diminish more rapidly, and assume a more laminar flow than in primary bore 122 of offset cross junction 120.

Figure 25:
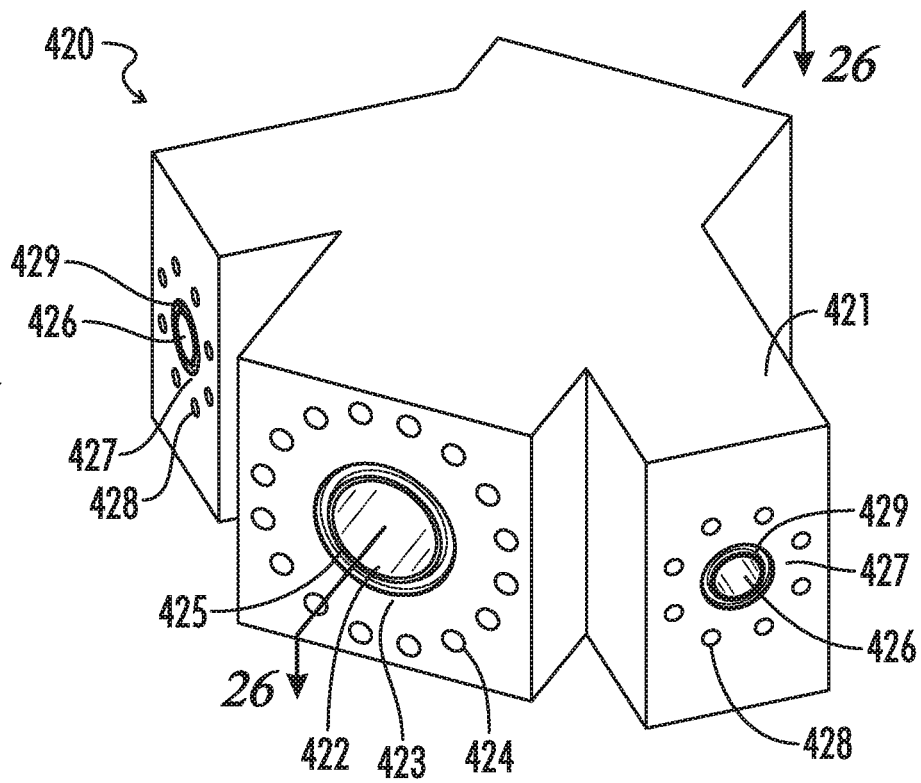
FIG. 25 is an isometric view of a fourth preferred embodiment of the flowline components of the subject invention, namely, an offset lateral cross junction 420 having straight-line feed bores which may be used, for example, in missile 113 of frac trailer 110.
Figure 26:
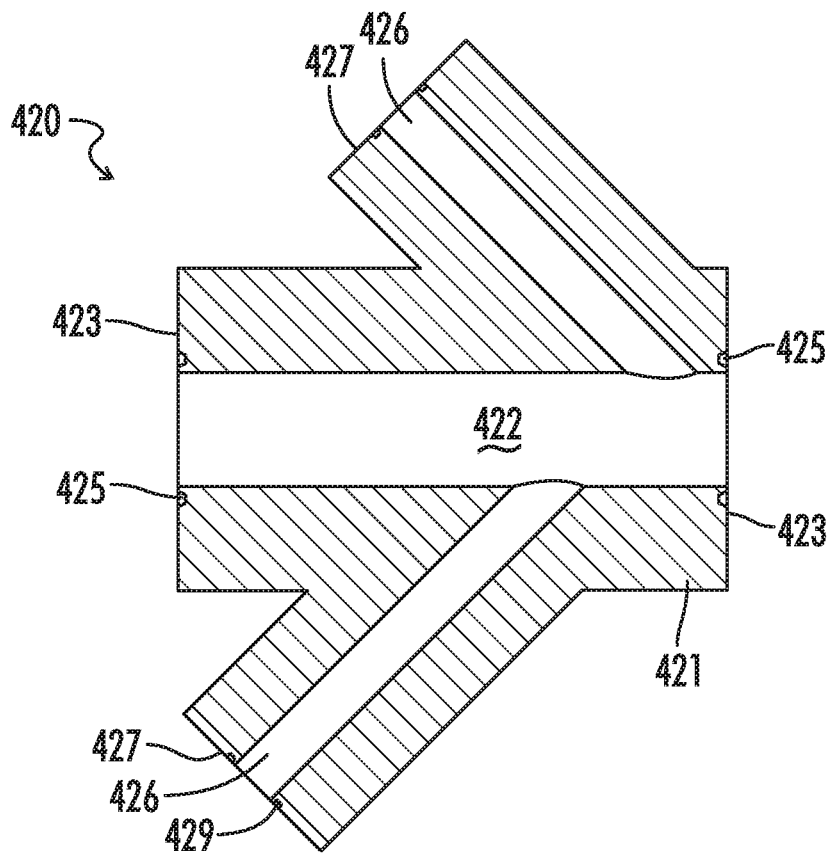
FIG. 26 is a cross-sectional view of offset lateral cross junction 420 shown in FIG. 25.

Offset lateral cross junction 420 also may be connected to two pumps and used in missile 113 or elsewhere in flow line 100. As may be seen in FIGS. 25-26, offset lateral cross junction 420 is substantially identical to offset lateral cross junction 320 except that feed bores 426 in junction 420 do not incorporate a long-sweep curve. It may be modified and adapted in various respects as can be junction 320.

Figure 27:
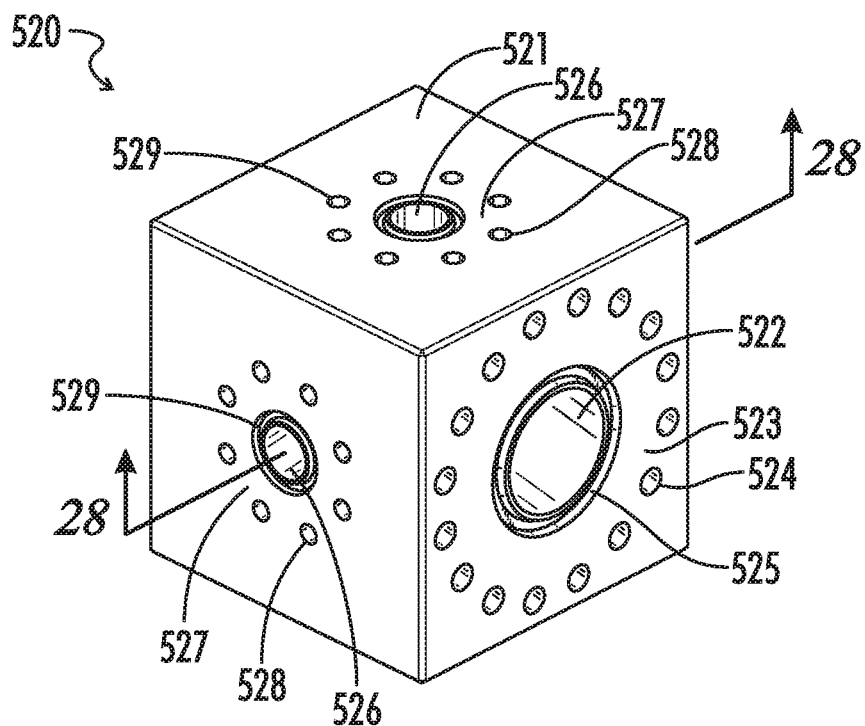
FIG. 27 is an isometric view of a fifth preferred embodiment of the flowline components of the subject invention, namely, a cross junction 520 having right-angle feed bores which may be used, for example, in missile 113 of frac trailer 110.
Figure 28:
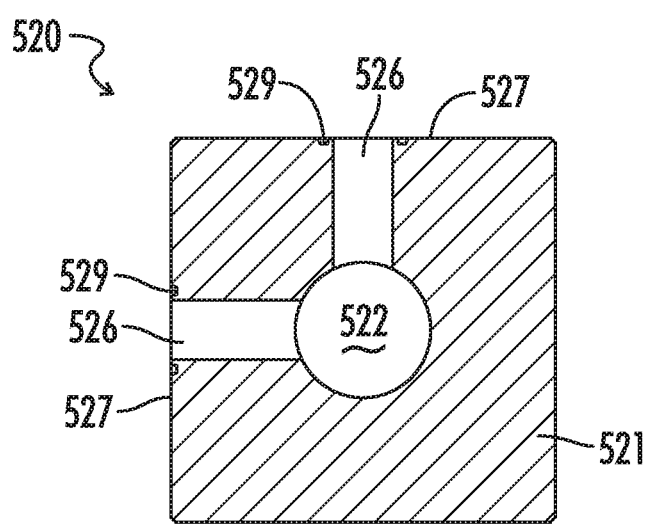
FIG. 28 is a cross-sectional view of right-angle cross junction 520 shown in FIG. 27.

Right-angle cross junction 520, which is shown in FIGS. 27-28, also may be incorporated into missile 113 and connected to two pumps 10. Right-angle cross junction 520 has a polyhedral or, more specifically, a generally cubic body 521. Primary bore 522 extends through body 521 and provides the primary conduit through which slurry passes as it is conveyed towards well head 17. Bore 522 extends between opposing flat surfaces or union faces 523 on body 521.

Right-angle cross junctions 520 also are provided with a pair of bores 526 which provide conduits for feeding discharge from an individual pump 10 into primary bore 522. Bores 526 extend perpendicularly from adjacent flat union faces 527 on body 521 and lead into primary bore 522. Primary union faces 523 and feed union faces 527 are substantially identical to union faces 123 and 127 in offset cross junction 120. They also may be provided with weep ports (not shown) if desired.

It will be noted that bores 526 in right-angle cross junctions 520 are perpendicular to each other and intersect with primary bore 522 and each other at right angles. Right-angle cross junctions 520, therefore, may make it easier to assemble pump discharge lines 12 from pumps 10 on either side of cross junction 520. Consistent therewith, it will be appreciated that the angle between bores 526 and union faces 527 may be varied. The a angle may be somewhat greater or lesser than 90° and still facilitate connection of pump discharge lines 12 from pumps staged on opposite sides of cross junction 520. Bores 526 also may be offset along primary bore 522, similar to offset cross junction 220, may intersect with primary bore 522 at an angle, similar to offset lateral cross junction 420, or may incorporate both such features. Similarly, feed bores 526 may incorporate a long-sweep curve, such as is present in feed bores 126 of junction 120 and feed bores 326 of junction 320, to further minimize erosion in junction 520.

It will be appreciated that the novel junctions may be modified in various ways consistent with the invention. For example, offset junction 120 and the other exemplified junctions may be provided with a bleeder port allowing a pressure relief valve to be assembled to the junction. Flange union faces may be provided around the port to allow the valve or a valve assembly to be joined to the junction by a flange union. A port also may be provided to allow assembly of a gauge to offset junctions 120.

The novel junctions also may incorporate additional feed ports. Offset junction 120, for example, may be provided with a third offset feed bore 126. Two feed bores 126 may be spaced along one side of body 121, intersecting with primary bore 122 along that side of cross junction 120. The third feed bore 126 may be provided on the other side of body 121 such that its intersection with primary bore 122 is axially between the intersections of the other two feed bores 126 with primary bore 122. Discharge from the three feed bores 126 will be spaced axially along primary bore 122.

Figure 10:
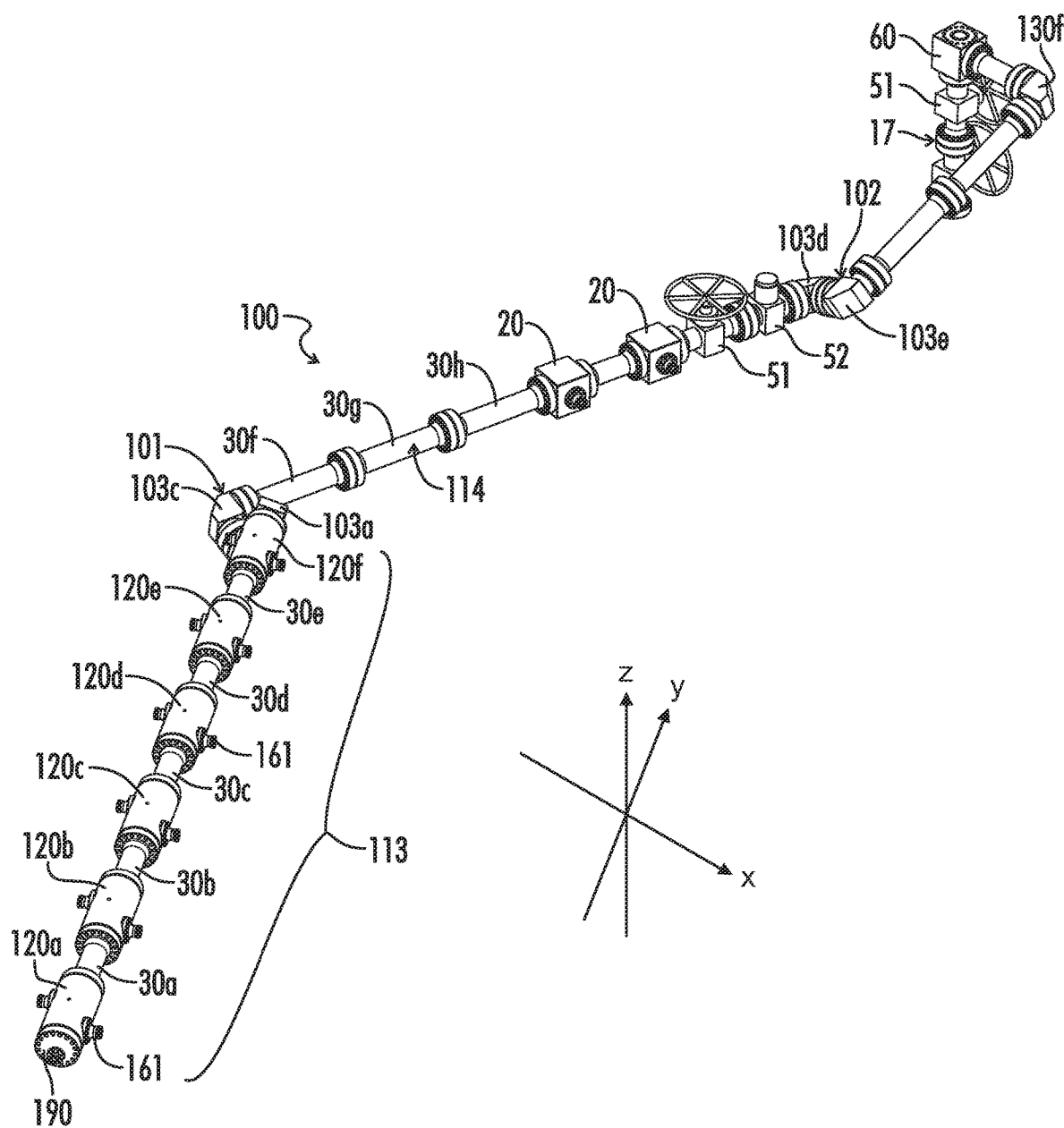
FIG. 10 is an isometric view of novel flow line 100 comprising missile 113 of frac trailer 110 and high-pressure flow line 114.
Figure 11:
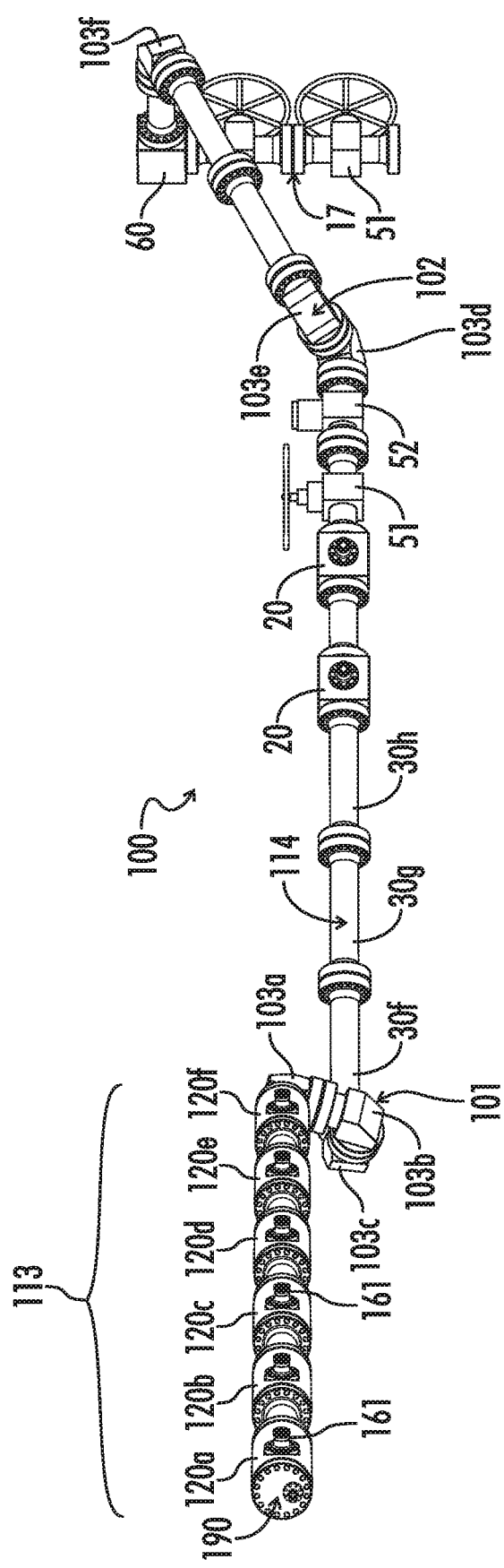
FIG. 11 is an elevation view of flow line 100 shown in FIG. 10.

Missile 113 will discharge into flow line 114. Flow line 114 is shown in more detail in FIGS. 10-11. As shown therein, it generally comprises a 4-axis swivel joint subassembly 101 having three rotatable elbows 103, additional spools 30, cross junctions 20, valves 51 and 52, a 3-axis swivel joint subassembly 102 having two rotatable elbows 103, and a single rotatable elbow 103f. It will be noted that for the sake of simplification, FIGS. 10-11 show flow line 114 as connecting to a single well head 17 whereas in FIG. 2 flowline is illustrated as feeding into junction head 115 of zipper manifold 16. In general, the novel flow lines may feed into any conventional wellhead assembly.

Well head 17 comprises a tee connector 60 and a pair of manual gate valves 51. In accordance with common industry practice, many other components may be assembled into well head 17. Such components also are not illustrated for the sake of simplicity. It also will be appreciated that in the context of novel flow lines which are adapted to deliver fluid from a plurality of pump discharges to a well head, a wellhead assembly will be considered to include such conventional well heads, but also zipper manifolds and the like which may selectively divert flow into a plurality of individual well heads.

Flowline segment 114, as illustrated, may incorporate additional or fewer spools 30 of varying lengths running from missile 113 to make up the distance between frac manifold 110 and well head 17. The novel flow lines also may incorporate other conventional flowline components, units, and subassemblies. For example, flowline segment 114 incorporates cross junctions 20. Cross junctions 20 may be used to allow additional flowline components or segments to be added, such as pressure relief valves or bleed-off lines. The novel flow lines also may incorporate, for example, gauges and other monitoring equipment, as well as control devices such as shut off, plug, check, throttle, pressure release, butterfly, and choke valves. For example, flow line 114 is provided with valves 50 and 51. Valve 50 is a conventional manual gate valve. Valve 51 is a conventional hydraulic gate valve which may be controlled remotely.

Like missile 113, flowline segment 114 and other novel flow lines preferably will incorporate ports allowing the flow line to be flushed and cleaned out between operations. For example, a flush-port assembly 190 may be assembled to a tee junction assembled into flowline segment 114 at a desired location. Tee connector 60 in well head 17, for example, may be replaced with a cross junction 20 having a flush-port assembly 190. The entire flow line 100 thus may be flushed by introducing clean fluid into missile 113 at cross junction 120a and allowing it to flow out flush port 190 on well head 17.

Figure 29:
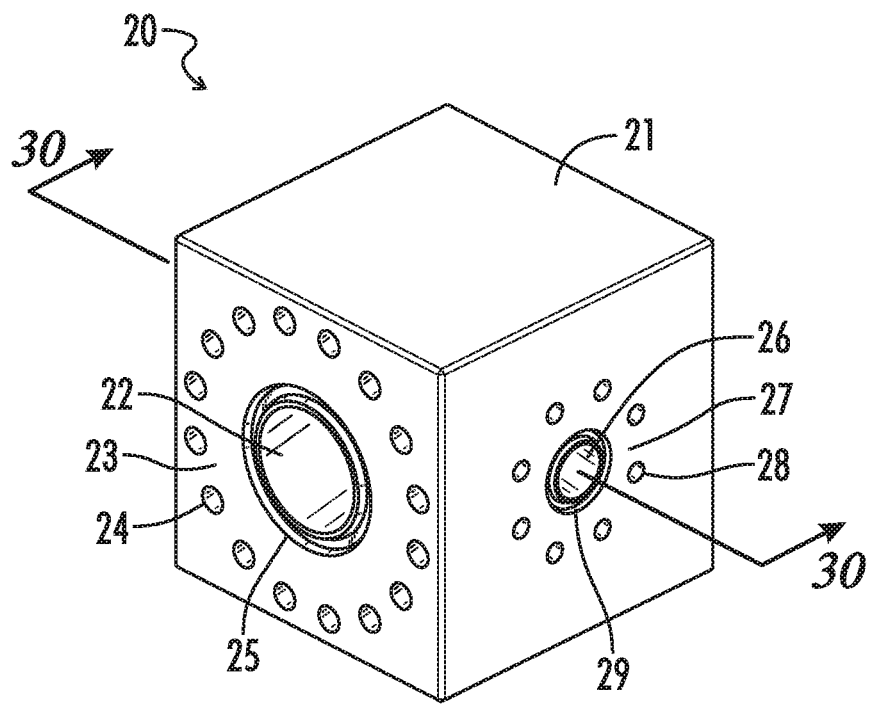
FIG. 29 is an isometric view of a cross junction 20 used in flow line 114.
Figure 30:
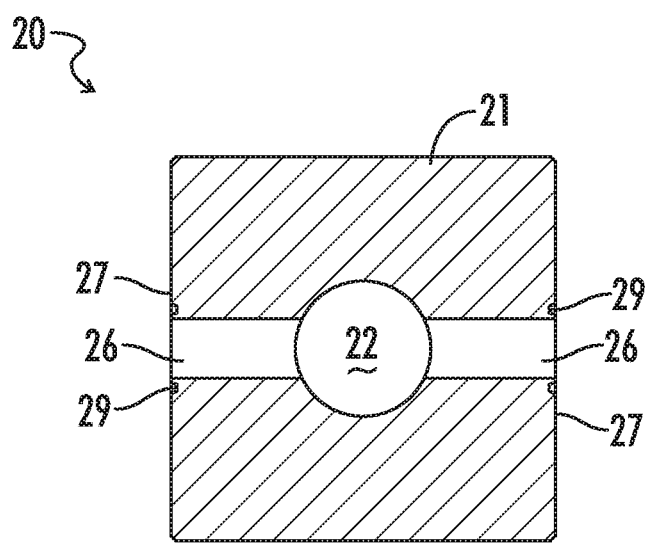
FIG. 30 is a cross-sectional view of cross junction 20 shown in FIG. 29.

Cross junctions 20 are shown in greater detail in FIGS. 29-30. As seen therein, cross junction 20 has a generally cubic body 21 having a primary bore 22. Bore 22 provides the primary conduit through which slurry passes as it is conveyed towards well head 17. Bore 22 extends between opposing flat surfaces or union faces 23 on body 21. Cross junctions 20 also are provided with a pair of bores 26 which provide conduits for feeding fluid from other flow lines into flowline segment 114, or for diverting fluid from primary bore 22. Bores 26 extend from opposing flat union faces 27 on body 21 and lead into and intersect with primary bore 22. Primary union faces 23 and feed union faces 27 are substantially identical to union faces 123 and 127 in offset cross junction 120.

It will be noted that bores 26 are aligned along their central axes and intersect with primary bore 22 at right angles. Thus, it will be appreciated that cross junctions 20 may be more suitable for diverting flow from a main flow line, such as flow line 114 and as illustrated in FIGS. 10-11. They may be used to connect pumps 10, but opposing high-pressure, high-velocity flows, such as the discharge from pumps 10, may create undesirable harmonics in the system and lead to excessive vibration. Feed bores 26, however, may be modified to incorporate a long-sweep curve, such as is present in feed bores 126 of junction 120, to reduce such harmonics and to further minimize erosion in junction 20.

Flow lines necessarily must change course as flow is split or combined. Ideally, however, those portions of a flow line extending between junction fittings, would extend in a straight line. Unfortunately, that rarely, if ever, is possible. For example, as best appreciated from FIGS. 10-11, in flowline 100, junctions 120 in missile 113 are all aligned and extend in a straight line along they-axis. Junctions 120 and missile 113, however, are not aligned with well head tee connector 60, which has a union face oriented more or less perpendicular to the x-axis. It also is rarely practical to position pumping units 10, frac trailer 110, and other frac equipment such that they are aligned. There is a large amount of equipment at a well site, especially during fracturing operations. The flow line must be able to accommodate whatever spatial constraints are present at a site.

Thus, the novel flow lines may incorporate various fittings, such as various combinations of novel rotatable elbows 103, to change the direction or course of the flow line as required for a specific well site. For example, as shown in FIGS. 10-11, missile 113 runs straight along (i.e., parallel to) they-axis between offset cross junction 120a and offset cross junction 120f. The heading of flow line 100 may be changed by incorporating various combinations of rotatable elbows 103. Specifically, 4-axis swivel joint 101, 3-axis swivel joint 102, and rotatable elbow 103f have been used to provide changes in the heading of flow line 100 to accommodate the position of frac manifold 110 relative to well head 17.

Swivel joints 101 and 102 comprise, respectively, three and two rotatable elbows 103 assembled together. More specifically, as may be seen in FIGS. 10-11, swivel joint 101 comprises three rotatable elbows 103a, 103b, and 103c. Though not fully illustrated in the figures, it will be appreciated that each rotatable elbow 103 generally comprises a body and two flanges. A central bore makes a long-sweep 90° turn within the body between two, mutually perpendicular union faces. The flanges are rotatably mounted on the elbow body on threads extending around the bore openings. The rotatable flanges allow elbows 103 to be made up at the union faces to each other and to other flowline components by a rotatable, flange-type union. The union allows elbows 103 to rotate to any degree relative to an adjacent flowline component before the union is loaded and fully tightened. Thus, elbows 103 may provide a 90° turn to the left, to the right, or at any angle relative to the adjacent component.

Rotatable elbows 103 are described more fully in applicant's U.S. patent application Ser. No. 15/804,353, filed Nov. 6, 2017, the disclosure of which is incorporated herein by reference. It will be noted that rotatable elbows 103 and swivel joints 101 and 102 shown in FIGS. 10-11 are substantially identical, respectively, to rotatable elbows 140 and swivel joints 101 and 102 disclosed in the '353 application. In any event, rotatable elbows 103 will allow greater control over the angular alignment of components in a flowline and, therefore, over the direction (or heading) and course (or track) of a flowline.

At the same time, it will be appreciated that other fittings may be used to change the direction or course of the flow line as required for a specific well site. For example, various combinations of angled shims, standard spools, and offset spools may be used as described in applicant's U.S. patent application Ser. No. 15/399,102, filed Jan. 5, 2017, the disclosure of which is incorporated herein by reference. While they are more prone to leaking and failure, conventional swivel joints also may be used.

The novel flow lines also may be installed within and supported by modular skid systems. Such systems are described more fully in applicant's '102 application. It will be appreciated as well that such modular systems may incorporate assemblers facilitating the make-up and breakdown of components mounted on the skids.

Figure 31:
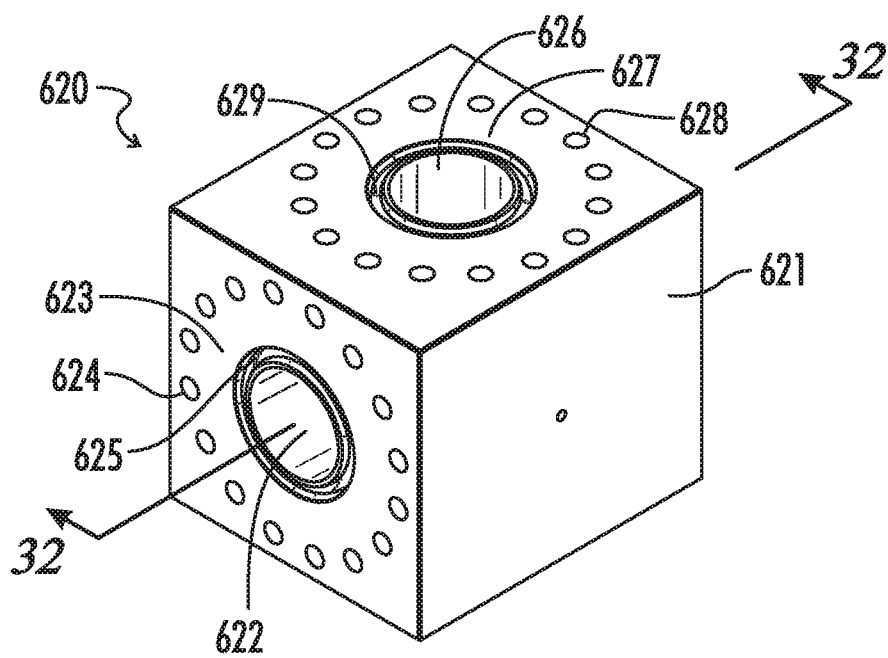
FIG. 31 is an isometric view of a sixth preferred embodiment of the flowline components of the subject invention, namely, a tee junction 620 having a long-sweep feed bore which may be used, for example, in flow line 114.
Figure 32:
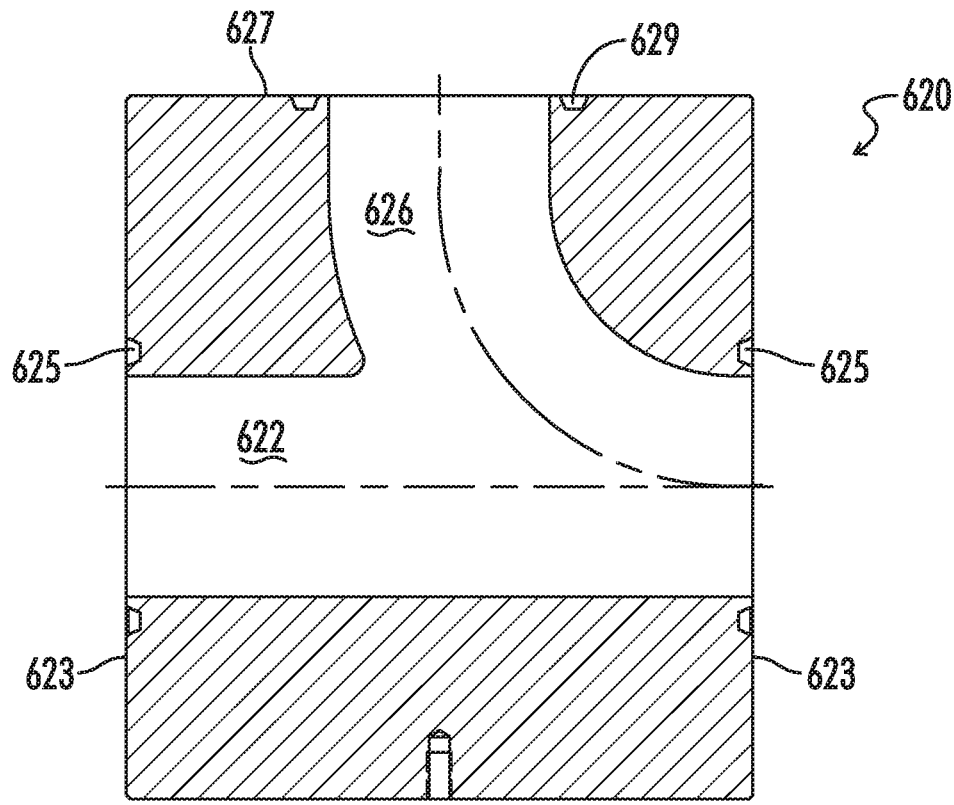
FIG. 32 is a cross-sectional view of tee junction 620 shown in FIG. 31.

The subject invention includes other preferred embodiments which may be used to assemble flow lines. For example, a novel tee junction 620 is shown in FIGS. 31-32. As shown therein, tee junction 620 has a generally cubic body 621 having a primary bore 622. Bore 622 provides the primary conduit through which slurry passes as it is conveyed through tee junction 620. Bore 622 extends between opposing flat surfaces or union faces 623 on body 621. Tee junction 620 also is provided with a bore 626 which provides a conduit for feed fluid from other flow lines into, or for diverting fluid out of primary bore 622. Bore 626 extends from a flat union face 627 on body 621 and leads into and intersects with primary bore 622. Primary union faces 623 and feed union face 627 are substantially identical to union faces 123 and 127 in offset cross junction 120.

Like bores 126 in offset cross junction 120, feed bore 626 in tee junction 620 is provided with a long-sweep curve leading into primary bore 622. The sweep ratio of bore 626 is approximately 1.33. By providing feed bores 627 with a long-sweep curve instead of a straight-line bore, fluid discharged from feed bores 627 will be directed at an angle more along, and less across the flow of fluid through primary bore 622. It will be expected, then, that the average angle of impact for particles flowing into primary bore 622 will be diminished and, correspondingly, erosion of primary bore 622. Like fitting 120, it also will be appreciated that tee fitting 620 may easily be manufactured with a cylindrical body.

Figure 33:
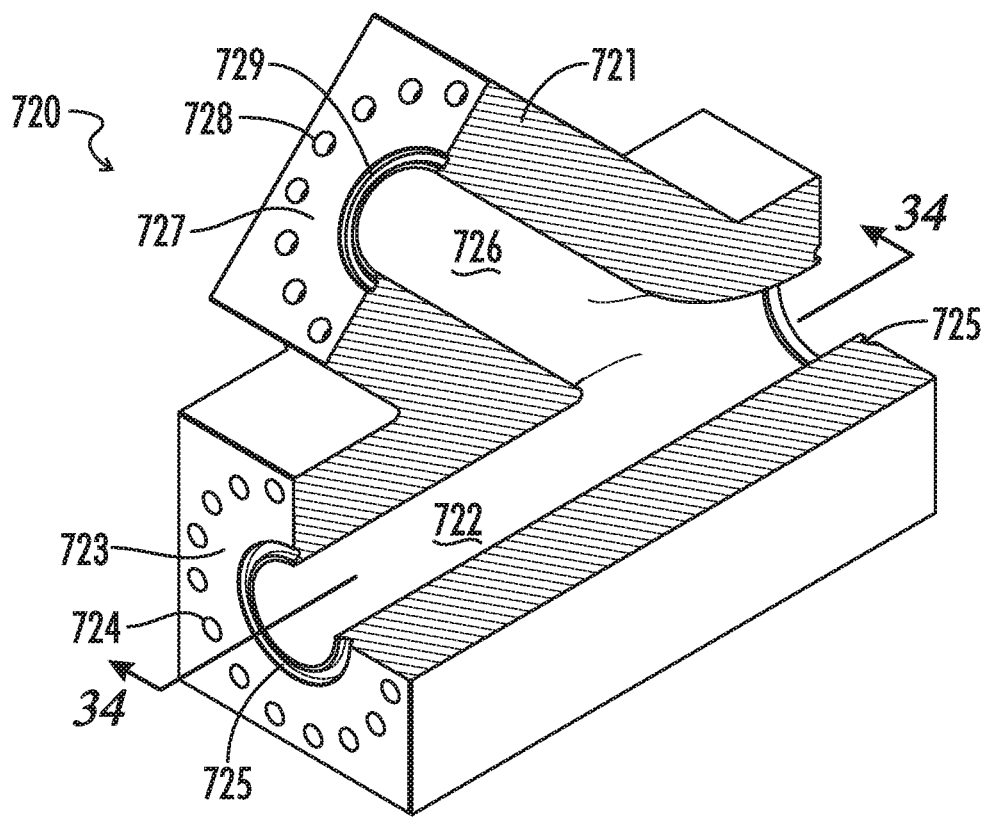
FIG. 33 is an isometric view, with an axial quarter-section removed, of a seventh preferred embodiment of the flowline components of the subject invention, namely, a lateral junction 720 having a long-sweep feed bore which may be used, for example, in flow line 114.
Figure 34:
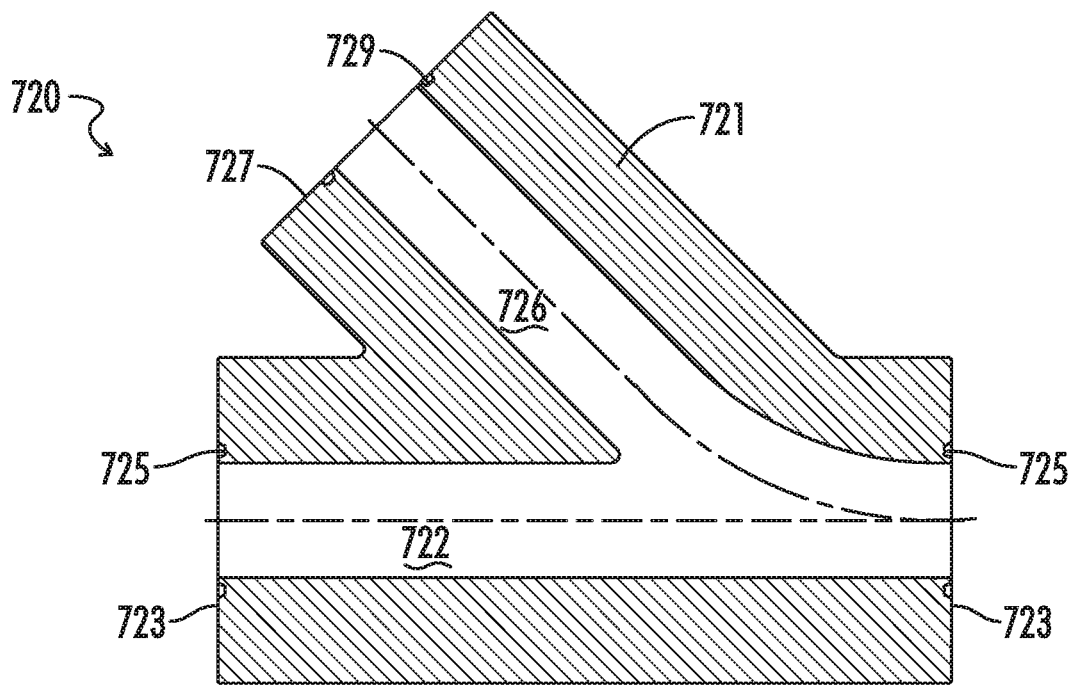
FIG. 34 is a cross-sectional view of lateral junction 720 shown in FIG. 33.

FIGS. 33-34 illustrate a novel lateral junction 720 which is similar in many respects to junctions 320 and 620. Lateral junction 720 has a generally prismatic body 721, what also may be visualized as an elongated solid rectangular body with a prismatic extension off a face thereof. In any event, body 721 has a primary bore 722 which provides the primary conduit through which slurry passes as it is conveyed through lateral junction 720. Bore 722 extends between opposing flat surfaces or union faces 723 on body 721. Lateral junction 720 also is provided with a bore 726 which provides a conduit for feed fluid from other flow lines into, or for diverting fluid out of primary bore 722. Bore 726 extends from a flat union face 727 on body 721 and leads into and intersects with primary bore 722. Primary union faces 723 and feed union face 727 are substantially identical to union faces 123 and 127 in offset cross junction 120.

Like bores 326 in offset lateral cross junction 320, feed bore 726 in lateral junction 720 generally extends toward primary bore 722 at an interior angle of about 45°. As it approaches primary bore 722, however, bore 726 is provided with a long-sweep curve having a sweep radius of approximately 3.5. It may be expected, therefore, that erosion in primary bore 726 will be reduced.

The flowline components of the subject invention may be manufactured by methods and from materials commonly used in manufacturing flow iron components. Given the extreme stress and the corrosive and abrasive fluids to which flowline components are exposed, especially those designed for high-pressure, high-velocity flow lines, suitable materials will be hard and strong. For example, the novel junctions, except for their seals, may be manufactured from 4130 and 4140 chromoly steel or from somewhat harder, stronger steel such as 4130M7, high end nickel alloys, and stainless steel. The components may be made by any number of conventional techniques, but typically and in large part will be made by forging, extruding, or mold casting a blank part and then machining the required features into the part. Conventional components of the novel flow lines are widely available from a number of manufacturers.

The novel junctions also may incorporate spanning and other wear sleeves as disclosed in applicant's '102 application. Such wear sleeves can provide additional resistance to erosion and wear, especially when provided in areas subject to turbulent flow. Wear sleeves also may be replaced after a period of service, thus avoiding the need to scrap an entire part.

The novel flowline components have been exemplified largely in the context of assembling flow lines through flange unions. That is, fittings such as offset cross junction 120, have been exemplified as having union faces adapted for connection to another flowline component by a flange union. If desired, however, other types of unions may be used in the novel flow lines. Flanged hammer union or clamp union subs may be joined to a block fitting by a flange union, allowing additional components to be joined by a hammer union or a clamp union. A hammer union sub or a clamp union sub also may be provided integrally on the novel fittings if desired, although as noted below, various advantages may be gained by assembling the novel flow lines with flange unions.

In general, the novel fittings may be manufactured easily in any of the sizes commonly employed for frac iron. They are not limited to a particular size. At the same time, however, when manufactured in relative large sizes with relatively large internal diameters, the novel fittings and flow lines may provide a single, relatively large flowline over much of the high-pressure side of a frac system. Flow line 100, for example, runs from pump discharges lines 12 all the way to well head 17. Various advantages may be derived therefrom.

First, the overall layout at a well site is greatly simplified. Simplification of the frac system can create space to access other portions of the system and reduce confusion among workers at the site. Moreover, by replacing multiple lines with a single line, the total number of components in the system may be reduced. Fewer components mean fewer junctions and fewer potential leak and failure points in the system. Fewer components also means less assembly time at a well site.

Second, exposed elastomeric seals are a potential source of leaks. They also increase turbulence through a conduit and, therefore, erosion resulting from the flow of abrasive slurry through the flow line. The novel flow lines, however, preferably are assembled using flange unions. Flange unions do not have any exposed elastomeric seals. They have internal metal seals situated between the union faces. Thus, preferred fittings, such as offset cross junctions 120, have union faces adapted for flange unions, and flow line 100 does not have any exposed elastomeric seals other than those that necessarily may be present in components such as control valves.

It will be noted in particular that preferred flow lines, such as flow line 114, are able to accommodate changes in direction without conventional directional fittings such as elbows, but especially without using swivel joints. Swivel joints are expensive. They incorporate elastomeric seals and packings. Many also have sharp turns which are particularly susceptible to erosion. Moreover, they are particularly susceptible to bending stress caused by vibrations in the flow line. Such strain can lead to failure. In any event, it means that swivel joints have a relatively shorter service life than many flowline components. Thus, swivel joints not only are a big component of the overall cost of a flow line, but they are a primary source of potential leaks and failure.

The relatively large inner diameter of the novel flowlines such as missile 113 and flow line 114 can help minimize erosion and failure in other ways. As the diameter of a conduit increases, drag on the fluid passing through the conduit increases, but not as rapidly as the volume of fluid. Thus, proportionally there is less drag, and flow through the conduit is more laminar. Moreover, by replacing multiple smaller lines with a single larger line, overall drag on fluid conveyed through the system is reduced. For example, a single 7 1/16" line may replace six 3" lines. The drag through the larger line will be less than half the cumulative drag through the six smaller lines. More importantly, less drag means less erosion.

As noted above, the long-sweep curves provided in many embodiments of the novel fittings further reduce drag by reducing turbulence at the bore intersections. In this regard, it will be appreciated that optimal sweep ratios may vary from fitting to fitting. In general, larger diameter feed bores will have smaller sweep ratios than similarly curved bores with smaller diameters. Low ratios, especially for small diameter bores, will mean a more severe curve which can lead to increased erosion in the feed bore. Higher ratios, regardless of the bore diameter, will direct fluid more along, and less across flow in the primary bore, but will necessarily either add to the overall length of the bore or will diminish the length of the curve. In general, however, for the bore sizes typically used in frac iron, it is expected that a sweep ratio of from about 1.25 to about 8 generally will be preferred. In any event, the more gradual turns provided by various embodiments of the novel fittings will tend to reduce the angle of impingement of abrasive particles on the conduit walls and will help reduce brittle erosion through the flow line.

In addition, and in accordance with a preferred aspect of the novel systems, the diameter of novel flowlines will approximate or equal, or even exceed the inner diameter of the liner extending through that portion of the well which will be fractured, what is referred to as the production liner. Production liners commonly have an inner diameter of at least about 5 inches. For example, they commonly are assembled with 5 1/8" or 7 1/16" tubulars having, respectively, nominal inner diameters of 5.13" and 7.06". Thus, the inner diameter of missile 113 and flowline 114, for example, may be 7.06" to match it to the commonly employed 7 1/16" production liner. Junction head 115, zipper manifold 16, and well head 17 also may be provided with similarly sized inner conduits. Preferably, they will have diameters of at least about 5 inches or at least about 7 inches. By matching the size of the novel flowlines to the size of the production liner, backpressure through the system is reduced. It will be possible to provide equivalent flow rates through the system, and provide equivalent fracturing pressures in the production liner with less pumping pressure at the surface. Consequently, it may be possible to reduce the number of pumps required for a particular frac job. In any event, the pumps may be operated at lower pressures, minimizing wear and tear on those units.

Perhaps most importantly, the relatively large diameter of the novel flow lines, such as flow line 100, along with their relatively straight course and, where necessary, more gradual turns may create the opportunity for on-site inspection. That is, there are various conventional systems which allow inspection of the inside of pipelines used to transport oil and gas. Such pipelines typically have larger internal diameters and fewer turns, especially sharp turns, than are present in conventional frac systems. Such in-line inspection (ILI) systems include cameras which are deployed into a conduit to visually inspect the internal walls for defects. The capabilities of visual ILI systems may be enhanced by using penetrating dyes. Magnetic-flux leakage, magnetic particle, and electromagnetic acoustic transducer ILI systems also may be deployed to detect electromagnetic anomalies caused by corrosion and erosion. Pit gauges, calipers, or 3-D laser (LIDAR) systems also may be deployed to map the surface of the conduit.

Many of those systems and techniques are used to inspect components at off-site production or certification facilities. The flow lines typically will be disassembled and their individual components inspected. The use of conventional ILI systems on site, however, is extremely limited or nonexistent in conventional flow lines used in frac systems. Conventional frac systems typically employ too many relatively small flow lines having a relatively high number of relatively sharp turns. It is difficult or impossible to run conventional ILI equipment through much, if not all of the system.

By using a single, relatively large flow line with more gradual bends, however, various embodiments of the invention make such in-line inspection techniques possible. For example, flow line 100 has a single, relatively large diameter flow line running all the way from discharge lines 12 of pumps 10, that is, from and including missile 113 to well head 17. Flow line 100 preferably will be made up of components having a conduit of at least about 5 inches in diameter. Typically, the components will have conduits having about 5 or about 7-inch diameters. Missile 113 runs straight. The bends in flow line 114 between cross junction 120*f* and well head 17 also are gradual. There are no sharp 90° turns. Even where directional fittings, such as rotatable elbows 103, are provided with intersecting bores instead of long sweep bores, their conduits will still be relatively large.

Thus, many conventional in-line inspections systems may be run into flow line 100 as assembled at a well site—without necessarily returning to a maintenance facility. For example, flush-port assembly 190 may be disassembled from cross junction 120*a*, allowing an ILI tool to be placed in missile 113 of frac trailer 110. The ILI tool then may be run through missile 113, into missile 113 of manifold module 210, and then through flowline 114, all without disassembly and while in service at a well site. Missiles 113 of frac trailer 110 and manifold module 210 may be inspected at a maintenance site before and after deployment without any significant disassembly. Thus, it may be expected that the novel flow lines will have significantly reduced maintenance costs.

It also will be appreciated that debris and other contaminants left behind in flow lines can interfere with many ILI systems. For example, visual inspections conducted by running cameras through flow line 100 require that the inner surfaces of the conduit be relatively clean. It will be appreciated that providing flush ports, such as flush-port assembly 190, will allow cleaning of flow line 100 without disassembly allowing, in turn, inspection of flow line 100 without disassembly.

Similarly, the novel flow lines and components have been described in the context of frac systems. While frac systems in particular and the oil and gas industry in general rely on temporary flow lines, the novel flow lines and components are not limited to such applications or industries. Suffice it to say that the novel flow lines and components have wide applicability in those fluid transportation systems where temporary flow lines have been conventionally applied.

While this invention has been disclosed and discussed primarily in terms of specific embodiments thereof, it is not intended to be limited thereto. Other modifications and embodiments will be apparent to the worker in the art.

What is claimed is:

1. A fluid transportation system for fracturing a well, said system comprising:
   (a) a missile adapted to manifold the discharge from a plurality of pumps;
   (b) a flow line connected to said missile;
   (c) a wellhead assembly connected to said flowline; and
   (d) a production liner extending into said well and in fluid communication with said wellhead assembly;
   (e) wherein the inner diameter of said missile and said flow line have diameters about equal to or greater than the inner diameter of said liner.

2. The frac system of claim 1, wherein said inner diameter of said liner is about equal to or greater than at least about 5 inches or at least about 7 inches.

3. A frac manifold comprising:
   (a) a frame; and
   (b) a missile adapted to manifold the discharge from a plurality of pumps and comprising cylindrical portions;
   (c) wherein said missile is mounted to said frame by a plurality of mounts, said missile being coupled to said mounts and said mounts being coupled to said frame;
   (d) wherein said mounts each comprise a pedestal coupled to said frame and a cradle supported on said pedestal;
   (e) wherein said missile is received in and coupled to said cradle at said cylindrical portions.

4. The frac manifold of claim 3, wherein:
   (a) said missile comprises a single missile;
   (b) said frame comprises two beams extending generally parallel to said missile and joined by cross-members; and
   (c) said pedestals are coupled to both said beams.

5. The frac manifold of claim 4, wherein each pedestal comprises a base coupled to said beams and a standard supporting said cradle, said standard extending across said base and at least partially across said beams.

6. The frac manifold of claim 3, wherein said missile comprises junction fittings having a generally cylindrical body and the length of said cradle is at least about 50% of the length of said junction fittings.

7. The frac manifold of claim 3, wherein said missile comprises junction fittings having a generally cylindrical body and the length of said cradle is at least about 80% of the length of said junction fittings.

8. A frac manifold module, said manifold module comprising a frame supporting:
   (a) a missile mounted on said frame and adapted to manifold the discharge from a plurality of pumps; and
   (b) at least two suction lines mounted on said frame, each said suction line being adapted to distribute flow to at least one of said plurality of pumps;
   (c) wherein said module lacks a suction manifold distributing flow to said suction lines.

9. The manifold module of claim 8, wherein said missile:
   (a) is adapted for connection at its downstream end to a flow line or to a missile on a first other frac manifold; and
   (b) is adapted for connection at its upstream end to a missile on a second other manifold.

10. The manifold module of claim 8, wherein said frame comprises a plurality of vertically adjustable, jackup legs adapted to raise and lower said frame.

11. The manifold module of claim 10, wherein said jackup legs comprise a vertical lifter.

12. The manifold module of claim 11, wherein said vertical lifter is attached to a horizontal extender.

13. The manifold module of claim 8, wherein said suction lines:
   (a) are adapted for connection at their downstream ends to suction lines on a first other frac manifold; and
   (b) are adapted for connection at their upstream end to suction lines on a second other frac manifold.

14. A frac manifold system, said manifold system comprising a first and second manifold module, wherein:
   (a) said first manifold module is the manifold module of claim 8 and said missile is a single missile a straight flow line adapted to manifold the discharge from a first plurality of pumps; and
   (b) said second manifold comprises:
   i) a frame; and
   ii) a single missile providing a straight flow line adapted to manifold the discharge from a second plurality of pumps;
   (c) wherein said missile on said first module is joined to said missile on said second module.

15. The manifold system of claim 14; wherein said missiles on said first and second modules are aligned to provide a straight flow line.

16. The manifold system of claim 14, wherein:
   (a) said second module comprises a pair of suction lines and a suction manifold adapted to distribute flow to said suction lines; and
   (b) wherein said suction lines on said first module are connected to said suction lines on said second module.

17. The manifold system of claim 14, wherein at least one of said manifold modules comprises levelers adapted to align said missiles.

18. The manifold system of claim 14, wherein at least one of said manifold modules comprises a plurality of vertically adjustable, jackup legs adapted to raise and lower said manifold module.

19. The frac manifold of claim 18, wherein said jackup legs comprise a vertical lifter.

20. The frac manifold of claim 19, wherein said vertical lifter is attached to a horizontal extender.

21. A flowline assembly mounted on a frame, said assembly comprising:
   (a) a flow line comprising a plurality of components joined by unions along a common axis, said unions allowing said components to be made up and broken down;
   (b) said components being releasably coupled to said frame to restrict movement along said axis and, when released, adapted to translate relative to said frame along said axis;
   (c) a shifter adapted for selective coupling to said components and for movement relative to said frame along said axis;
   (d) wherein said shifter may be actuated to shift a first said component relative to a second said component along said axis by:
      i) uncoupling said first component from said frame and coupling said first component to said shifter; and
      ii) actuating said shifter.

22. The flowline assembly of claim 21, wherein said flow line is a missile and said components comprise cross junction fittings.

23. The flowline assembly of claim 21, wherein said components are coupled to said frame by a mount, said components being fixedly coupled to said mount and said mount being releasably coupled to said frame, and wherein said shifter and said mount may be selectively coupled.

24. The flowline assembly of claim 23, wherein said mount comprises a pedestal releasably coupled to said frame and a cradle adapted to receive said component.

25. The flowline assembly of claim 23, wherein said frame has two beams extending generally parallel to said axis and joined by cross-members and said mount is releasably coupled to said beams and is adapted to slide along said beams when said shifter is actuated.

26. The flowline assembly of claim 23, wherein said assembly comprises a bearing element disposed between said mount and said frame.

27. The flowline assembly of claim 21, wherein said assembly comprises a hydraulic cylinder coupled to said shifter.

28. A method of breaking down a flow line with a shifter mounted on a frame;
   wherein:
   (a) said flow line comprises a plurality of components joined by unions along a common axis,
   (b) said unions allow said components to be made up and broken down; and
   (c) said components are releasably coupled to said frame to restrict movement along said axis and, when released, adapted to translate relative to said frame along said axis; and
   (d) said method comprises:
      i) enjoining a first said component from a second said component;
      ii) uncoupling said second component from said frame; and
      iii) actuating said shifter to move said second component on said frame along said axis away from said first component.

29. A method of making up a flow line with a shifter mounted on a frame;
   wherein:
   (a) said flow line comprises a plurality of components joined by unions along a common axis,
   (b) said unions allow said components to be made up and broken down; and
   (c) said components are releasably coupled to said frame to restrict movement along said axis and, when released, adapted to translate relative to said frame along said axis; and
   (d) said method comprises:
      i) placing a first said component and a second said component on said frame;
      ii) actuating said shifter to move said second component on said frame along said axis toward said first component; and
      iii) joining said first component and said second component.

* * * * *

UNITED STATES PATENT AND TRADEMARK OFFICE
CERTIFICATE OF CORRECTION

PATENT NO. : 10,683,708 B2  
APPLICATION NO. : 15/837912  
DATED : June 16, 2020  
INVENTOR(S) : Larry Mitchel Hill et al.

Page 1 of 1

It is certified that error appears in the above-identified patent and that said Letters Patent is hereby corrected as shown below:

Column 38, Line 40, in Claim 14, after "a single missile", insert -- providing --.

Column 40, Line 16, in Claim 28, delete "enjoining", and insert therein -- unjoining --.

Signed and Sealed this
Twenty-first Day of July, 2020

Andrei Iancu
*Director of the United States Patent and Trademark Office*